(12) United States Patent
Missotten et al.

(10) Patent No.: US 10,292,333 B2
(45) Date of Patent: May 21, 2019

(54) LOWERABLE ROLLER SET OF A SECONDARY CUTTING UNIT FOR A COMBINE HARVESTER

(71) Applicants: CNH Industrial Belgium nv, Zedelgem (BE); ESM Ennepetaler Schneid—und Mähtechnik GmbH & Co. KG, Ennepetal (DE)

(72) Inventors: Bart M. A. Missotten, Herent (BE); Willem Vandamme, Ichtegem (BE); Alexander Numberg, Herdecke (DE); Wolfgang Oehler, Wipperfürth (DE)

(73) Assignees: CNH Industrial Belgium nv, Zedelgem (BE); ESM Ennepetaler Schneid—und Mähtechnik GmbH & Co., Ennepetal (DE)

( * ) Notice: Subject to any disclaimer, the term of this patent is extended or adjusted under 35 U.S.C. 154(b) by 187 days.

(21) Appl. No.: 14/903,943

(22) PCT Filed: Jul. 8, 2014

(86) PCT No.: PCT/EP2014/064657
§ 371 (c)(1),
(2) Date: Jan. 8, 2016

(87) PCT Pub. No.: WO2015/004162
PCT Pub. Date: Jan. 15, 2015

(65) Prior Publication Data
US 2016/0165799 A1 Jun. 16, 2016

(30) Foreign Application Priority Data
Jul. 8, 2013 (DE) .................. 10 2013 107 148

(51) Int. Cl.
*A01D 75/18* (2006.01)
*A01D 41/14* (2006.01)
*A01D 41/06* (2006.01)

(52) U.S. Cl.
CPC .......... *A01D 75/185* (2013.01); *A01D 41/06* (2013.01); *A01D 41/14* (2013.01); *A01D 41/144* (2013.01); *A01D 41/145* (2013.01)

(58) Field of Classification Search
CPC ...... A01D 75/185; A01D 41/06; A01D 41/14; A01D 41/141; A01D 41/144;
(Continued)

(56) References Cited
U.S. PATENT DOCUMENTS 983,477 A 2/1911 Brown
1,147,588 A 7/1915 Yokley
(Continued)

FOREIGN PATENT DOCUMENTS

EP 0212185 A1 3/1987
EP 1378159 B1 1/2004
(Continued)

*Primary Examiner* — Alicia Torres
*Assistant Examiner* — Adam J Behrens
(74) *Attorney, Agent, or Firm* — Peter K. Zacharias; Patrick M. Sheldrake

(57) ABSTRACT

A header for a combine harvester has a primary implement and a secondary implement with a roller unit. The roller unit has a frame element, an outer roller set with a rotatably supported roller and a central roller set with a rotatably supported roller. The central roller set is guided on the frame element to be lowerable relatively to the external roller set.

12 Claims, 29 Drawing Sheets

(58) Field of Classification Search
CPC .. A01D 41/145; A01D 34/8355; A01D 43/08; A01D 43/081; A01D 43/10; A01D 43/102; A01D 43/105; A01D 43/107; A01D 82/00; A01D 82/02
See application file for complete search history.

(56) References Cited

U.S. PATENT DOCUMENTS

| | | | |
|---|---|---|---|
| 1,813,631 A | 7/1931 | Minor | |
| 2,401,513 A * | 6/1946 | Schmidt | A01D 47/00 56/238 |
| 3,623,304 A | 11/1971 | Molzahn | |
| 3,984,966 A * | 10/1976 | Outtier | A01D 45/021 56/10.2 R |
| 4,126,987 A | 11/1978 | Sarich | |
| 4,715,174 A | 12/1987 | Lloyd et al. | |
| 5,433,065 A * | 7/1995 | Mosby | A01D 41/14 56/13.9 |
| 6,993,360 B2 | 1/2006 | Plahte et al. | |
| 7,661,251 B1 * | 2/2010 | Sloan | A01D 41/145 56/10.2 E |
| 7,874,135 B2 * | 1/2011 | Nagy | A01D 45/021 56/504 |
| 8,171,707 B2 * | 5/2012 | Kitchel | A01D 34/8355 56/504 |
| 8,919,088 B2 | 12/2014 | Dow et al. | |
| 9,474,209 B2 * | 10/2016 | Verhaeghe | A01D 41/145 |
| 9,485,907 B2 * | 11/2016 | Oehler | A01D 34/435 |
| 9,485,908 B2 * | 11/2016 | Verhaeghe | A01D 34/8355 |
| 9,554,510 B2 * | 1/2017 | Nurnberg | A01D 34/8355 |
| 2010/0083627 A1 | 4/2010 | Nagy et al. | |
| 2011/0179758 A1 * | 7/2011 | Kitchel | A01D 45/02 56/52 |
| 2014/0165527 A1 | 6/2014 | Oehler et al. | |
| 2014/0237980 A1 | 8/2014 | Verhaeghe et al. | |
| 2014/0311115 A1 | 10/2014 | Verhaeghe et al. | |
| 2014/0319253 A1 | 10/2014 | Nürnberg et al. | |
| 2015/0096773 A1 * | 4/2015 | Miller | A01D 34/8355 172/540 |
| 2016/0066504 A1 * | 3/2016 | Holman | A01D 34/8355 56/504 |

FOREIGN PATENT DOCUMENTS

| | | |
|---|---|---|
| EP | 1483953 A1 | 12/2004 |
| EP | 1932416 A1 | 6/2008 |
| FR | 2730126 A1 | 9/1996 |
| JP | H09103161 A | 4/1997 |
| JP | 2014171419 A | 9/2014 |

* cited by examiner

LOWERABLE ROLLER SET OF A SECONDARY CUTTING UNIT FOR A COMBINE HARVESTER

This application is the US National Stage filing of International Application Serial No. PCT/EP2014/064657 filed on Jul. 8, 2014 which claims priority to German Application 10.2013.107.148.1 filed Jul. 8, 2013, each of which is incorporated herein by reference in its entirety.

TECHNICAL FIELD OF THE INVENTION

The invention relates to a header for a combine harvester with a primary implement and a secondary implement.

A combine harvester has a front harvesting device—the so-called "header"—comprising a main cutting unit. The main cutting unit is the primary implement of the combine harvester with which the crop, e.g. wheat, is cut. Typically, the secondary implement is mounted at the rear of the "header" and serves to fulfil an additional function.

In particular, the combine harvester can be configured so that its main cutting unit for the crop is set at a relatively large horizontal distance from the ground ("high cut"). in this way, the mass of the stems fed into the combine harvester is reduced. The secondary implement, configured as a cutting implement, serves the purpose of cutting off the remaining, comparatively long stubbles from the ground and to cut them up.

The secondary implement can fulfil various functions. In particular, it can encompass cutting-off, cutting-up, comminuting or chopping. Other possible operations are ground processing, opening up of the ground, collection of vegetal components, sowing, etc. For instance, the secondary implement can also be a mower, a cutting unit, or a swathing arrangement.

STATE OF THE ART

A header for a combine harvester is known from international patent application WO 2013/011138 A. The header has a primary implement, which is configured as the main cutting unit of the combine harvester. The header further has a secondary implement, which is configured as a cutting unit. The secondary implement comprises a roller unit with a frame element and outer roller sets with a rotatably supported roller. Further, a central roller set with a rotatably supported roller is fixed to the frame element.

Another header for a combine harvester is known from German patent application DE 10 2011 051 981 A.

OBJECT OF THE INVENTION

The present invention seeks to solve the problem of providing a header for a combine harvester with a primary implement and a secondary implement for which the risk of damage to this secondary implement when moving over impediments is reduced and the header can be better transported on the road.

SOLUTION

According to the invention, the problem is solved by the features of the independent claims.

Further preferred embodiments according to the invention can be found in the dependent claims.

DESCRIPTION OF THE INVENTION

The invention concerns a header for a combine harvester with a primary implement and a secondary implement. The secondary implement has a roller unit. The roller unit has a frame element, an outer roller set with a rotatably supported roller and a central roller set with a rotatably supported roller. The central roller set is guided on the frame element to be lowerable relatively to the external roller set.

The invention further concerns a secondary implement for a combine harvester with such a roller unit, and such a roller unit.

BACKGROUND

In particular, the primary implement can be the main cutting unit of the combine harvester. So, for instance, it can be a grain or a maize cutting unit. In particular, the secondary implement can be a mowing unit, a cutting unit, or a swathing unit.

The secondary implement is arranged further to the rear of the header of the combine harvester than the primary implement. This means that during normal operation in the forward travel of the combine harvester, first the primary implement fulfils its function, and after further movement, the secondary implement fulfils its function. In normal operation, the movement of the secondary implement is arranged such that it moves parallel to the ground. This ensures an even processing of the ground.

In the case that impediments—e.g. deep ground undulations, trenches, rocks, etc.—must be crossed, the whole header, including the two implements, is lifted. However, if the header is one that is used for the so-called "high-cut" operation, there is the problem that, although the primary implement has been lifted up sufficiently high to pass over the impediment, the secondary implement, which is much closer to the ground, is too low for this. Thus, there is the danger of damage to the secondary implement when passing over the impediment.

A similar problem emerges during road transport of the header when it is dismounted from the combine harvester. When the header is separated from the combine harvester and loaded onto a trailer for road transport, then both implements attached to the harvester must be lifted over the wheels of the trailer. In the above described arrangement of displacement in the vertical direction of the two implements, the problem arises that, although the primary implement is arranged above the wheels, the secondary implement will still collide with them.

The header may further comprise a link coupled with the secondary implement. Now, to overcome the problems described above, the new header can comprise a lifting device with a slide element that is formed in such a manner and that is connected with the link so that a translational movement of the slide element causes with a lifting of the secondary implement relative to the primary implement. In this way, the height difference between the lowest point of the primary implement and the secondary implement is compensated in whole or at least in part. The header can be guided and loaded onto a trailer without the danger of a collision. In this way, the construction space available for the protected arrangement of the secondary implement can be optimally used.

The header has at its rear, as seen in the direction of travel, and in its centre an intake duct. The purpose of the intake duct is to take away the crop which have been cut by the primary implement and to feed it to a next processing step. It should be understood that the term "central zone" means the central plane in the longitudinal direction of the combine harvester and the header, perpendicular to the direction of travel. In other words, the central zone means the zone of the axis of symmetry of the header, extending outwardly in both directions. This central zone is to be distinguished from both outer zones on both sides of the combine harvester.

The bottom of the intake duct is already arranged to be very low—i.e. relatively close to the ground. Furthermore, piston-cylinder units are disposed in this area to lift or lower the complete header.

When the secondary implement, after raising the complete header by means of the lifting device, is lifted with respect to the primary implement to position the cutting unit of the primary implement into a protected lifted position, then the problem arises of a possible collision of the central set of rollers with the previously described piston-cylinder units and/or the intake duct.

Further Description

This problem will be overcome by lowering the central roller set with respect to the outer roller set when the header is lifted.

The secondary implement comprises besides its main device—more particularly its sickle bar with the reciprocatingly driven or rotating knives with a plurality of blades—also a roller unit that is arranged, as seen in the direction of travel, behind the blades and farther under the blades. This roller unit may comprise at least two—and preferably three—roller sets. The invention relates to the outer roller sets and the central roller set. Each roller set comprises at least one roller and preferably two rollers. The rollers are rotatably supported, and contact the ground in the operational position of the combine harvester. In this way, the desired parallel guidance of the blades of the secondary implement—i.e. the desired guidance of the blades with respect to the ground—is guaranteed. Besides its guide function, the roller unit can also have a further processing function for the cut crop and/or the ground, as is described in the international patent application WO 2013/011138 A1 of the applicants.

With such a secondary cutting unit, the blades constitute the sensitive parts and thus the parts that needs to be protected. The aim of lifting of the secondary implement relative to the primary implement is therefore to arrange the blades of the cutting unit in such a manner that they are positioned above a collision line. It is therefore preferable to lift the secondary implement relative to the primary implement so that the blades are arranged above the lowest point of the primary implement. So, the exposure of the secondary cutting unit is more a matter of this relative arrangement and less of the arrangement of the lowest point of the roller unit of the secondary implement.

This desired protected arrangement of the secondary implement—and particularly of its sensitive parts—is achieved by a suitable displacement of the slide element which connects the lifting device with the link. The lifting device is fixedly connected to the primary implement. In this respect, 'connected' means either through a direct connection or an indirect connection with an interposition of further components. In turn, the lifting device is connected via a link bearing and a coupling part—and possibly further components to the link. In turn, the link is connected either directly or indirectly via interposition of further components to the secondary implement. The secondary implement is also connected in its entirety to the primary implement wherein at least the lifting device and the link are interposed.

Thus, the part of the secondary implement to be shielded can be lifted by means of the new lifting device and in this way a less vulnerable part in the zone of the central plane in the longitudinal direction of the header can be lowered automatically. The central roller set swings or pivots downwards, when the header is lifted.

In this way, the central roller set is particularly mounted and guided on the frame element to automatically take the lowered position, when the roller of the central roller set is released from the ground during the lifting of the header. Thus, the lowering operation starts with the release of the roller from the ground and continues during the rest of the lifting movement of the header until the maximally lowered position of the central roller set has been reached. Then, the secondary implement can be lifted by means of the lifting means with respect to the primary implement, without causing a collision between parts.

In particular, the central roller set can take the lowered position by means of gravity only. This means that there is no need for an actuating device for this movement, but that the central roller set is arranged such that it can move sufficiently freely, under the influence of gravity and without being supported by the ground, to take the lowered position.

The central roller set can comprise a guiding element. The frame element can comprise a guiding slot, the guiding element engaging in the guiding slot and thus defining the path of movement of the central roller set. The guiding slot can have the form of an arc of a circle. Also a linear form is possible. The engaging of the guide element in the guiding slot ensures the reaching of the desired position of the roller set also when relatively high forces act on the roller set. In particular, this concerns the movement of the roller set from the lowered position into the operational position. This movement takes places automatically when the header is lowered resulting in the contact of the central roller with the ground. In this way, the guide also ensures that the pivot bearing of the central roller unit will not be damaged.

The secondary implement can comprise a cutting unit or another functional unit (hereafter collectively generalised and called "processing unit"), that processes crop and/or tills the ground. The processing unit is positioned in the driving direction of the roller unit. Consequently, the processing unit is guided by the roller unit parallel to the ground. Now, the central roller set can be supported rotatably by a bearing that is arranged under the processing unit and at a certain distance from the central roller set. In this manner, the central roller set is also supported by the guiding element and the bearing. Preferably, the bearing is arranged on the processing unit to also provide a stabilizing connection between the roller set and the processing unit.

The central roller set can have two side plates, the roller being arranged between the side plates. When the roller set has a plurality of rollers, these are arranged between the side plates. In addition, intermediate plates can be mounted between the rollers. Both side plates are generally L-shaped and have a first limb and a second limb. On both side plates, a guide element and a bearing are mounted. The guide element is mounted on the first limb—and in particular at the end region thereof—and the bearing is mounted on the second limb—and in particular at the end region thereof. The guiding elements engage in the corresponding guiding slot of the frame element and hence provide the desired guiding of the roller set during the swivelling movement along the path of the guiding slot. In this way, the central roller set is supported rotatably by the bearing on the other limb. Jointly, this results in a pendulum bearing of the central roller set.

The roller unit can comprise a second outer roller set with a rotatably supported roller. The central roller set is thus mounted between the outer roller sets. But, also further intermediate roller sets can be mounted. Every roller set can have one, two or more rollers. Preferably, the roller sets are modular, to enable them to be combined to form different working widths.

The invention also relates to a secondary implement for a combine harvester with a processing unit and a roller unit. The roller unit has a frame element, an external roller set comprising a rotatably supported roller, and a central roller set comprising a rotatably supported roller. The central roller set is guided on the frame element to be lowerable with respect to the outer roller set and the cutting unit. In particular, the secondary implement and the roller unit can be designed as described above in more detail.

The invention further relates to a roller unit for a header for a secondary cutting unit for a combine harvester. The roller unit has a frame element, an external roller set with a rotatably supported roller and a central roller set with a rotatably supported roller. The central roller set is guided on the frame element to be lowerable relatively to the external roller set. In particular, the roller unit can be designed as described above.

Advantageous developments of the invention are found in the claims, the description and the drawings. The advantages of the features and of combinations of several features mentioned in the description are only examples and can be effective alternatively or cumulatively without the advantages having to be achieved according to the present embodiments. Without the object of the appended claims being changed, the following applies, according to the disclosure of the original application documents and the patent: further features can be taken from the drawings—in particular, the depicted geometries and the relative dimensions of several components together as well as their relative arrangements and operational connections. The combination of features of different embodiments of the invention or of features of various claims also deviates from the selected references of the claims and is hereby proposed. This also applies to such features that are shown in separate drawings or that are mentioned in their description. These features can also be combined with features of various claims. Also the features mentioned in the claims, can be used for further embodiments of the invention.

The features mentioned in the claims and in the description are to be understood as regards their quantity, that exactly this quantity or a larger quantity than that mentioned is available without the requirement of an explicit use of the "at least" adverb. Therefore, when, for instance the term roller set is used, it is to be understood that exactly one roller set, two roller sets, or several roller sets are provided. These features can also be supplemented with other features or can be the only ones that make up the respective apparatus.

The reference numbers contained in the claims do not represent a limitation of the scope of the protected objects of the claims. Their purpose is solely to clarify the claims.

BRIEF DESCRIPTION OF THE FIGURES

In the following, the invention is further detailed and described on the basis of the depicted preferred embodiments.

DESCRIPTION OF THE FIGURES

Figure 1:
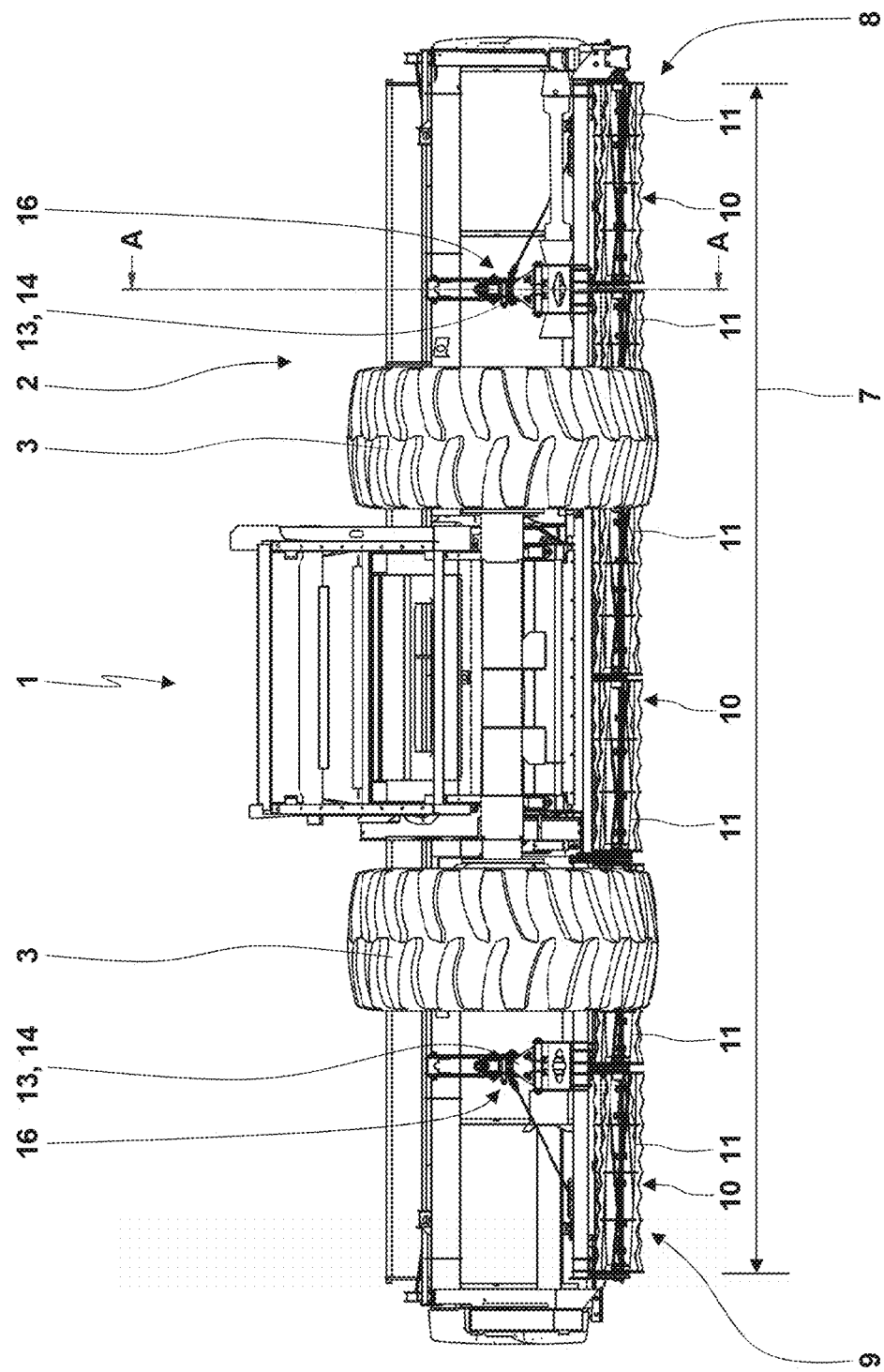
FIG. 1 shows a rear view of an exemplary embodiment of the new header for a combine harvester in its operational position.

FIGS. 1-7 show various views of an exemplary embodiment of a combine harvester 1 with a new header 2. When the respective figure shows a rear view or view from the rear, then it is to be understood that the respective view is seen when looking in the direction of travel 4 from the rear. This is applies to the other Figures. Only the front portion of the combine harvester 1 is shown, as the remainder of the combine harvester 1 has no importance for this invention.

The combine harvester 1 can be driven, and for this purpose has several wheels of which these figures only show the front wheels 3. In order to carry out its work, the combine harvester 1 travels in the direction of travel 4 over the ground 5. As the wheels tend to sink into the ground 5 and the tires deform, the depiction is simplified in such a manner that the lower part of the front wheels 3 are shown here as being below the ground 5.

The combine harvester 1 has a primary implement 6, which is its main cutting implement and serves for the actual harvesting process. The primary implement 6 defines the working width 7 of the combine harvester 1 perpendicularly to the direction of travel 4. The primary implement 6 itself is not an object of the present application and is thus not described in detail below.

Figure 2:
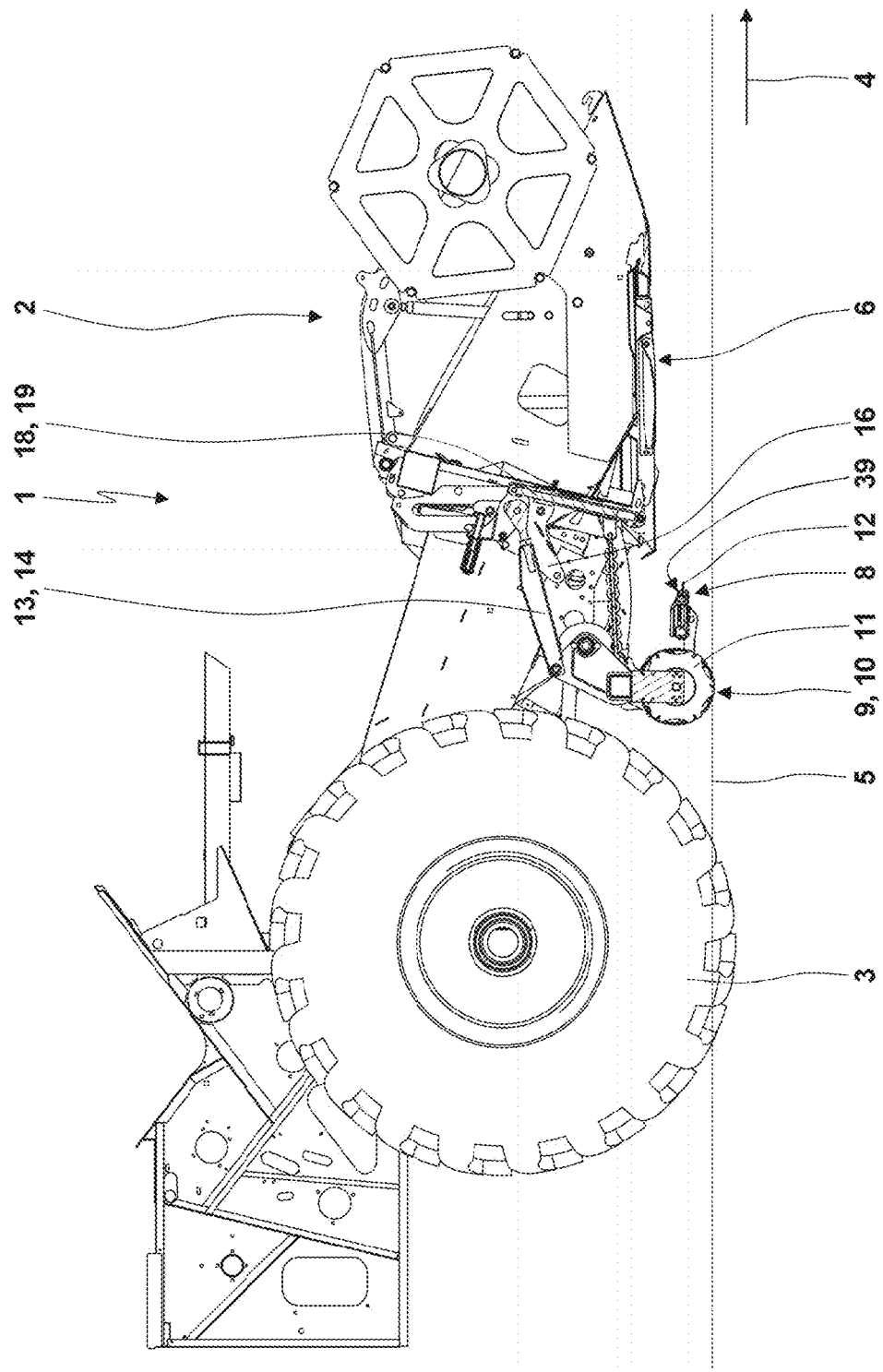
FIG. 2 shows a sectional view of the header according to line A-A in FIG. 1.
Figure 3:
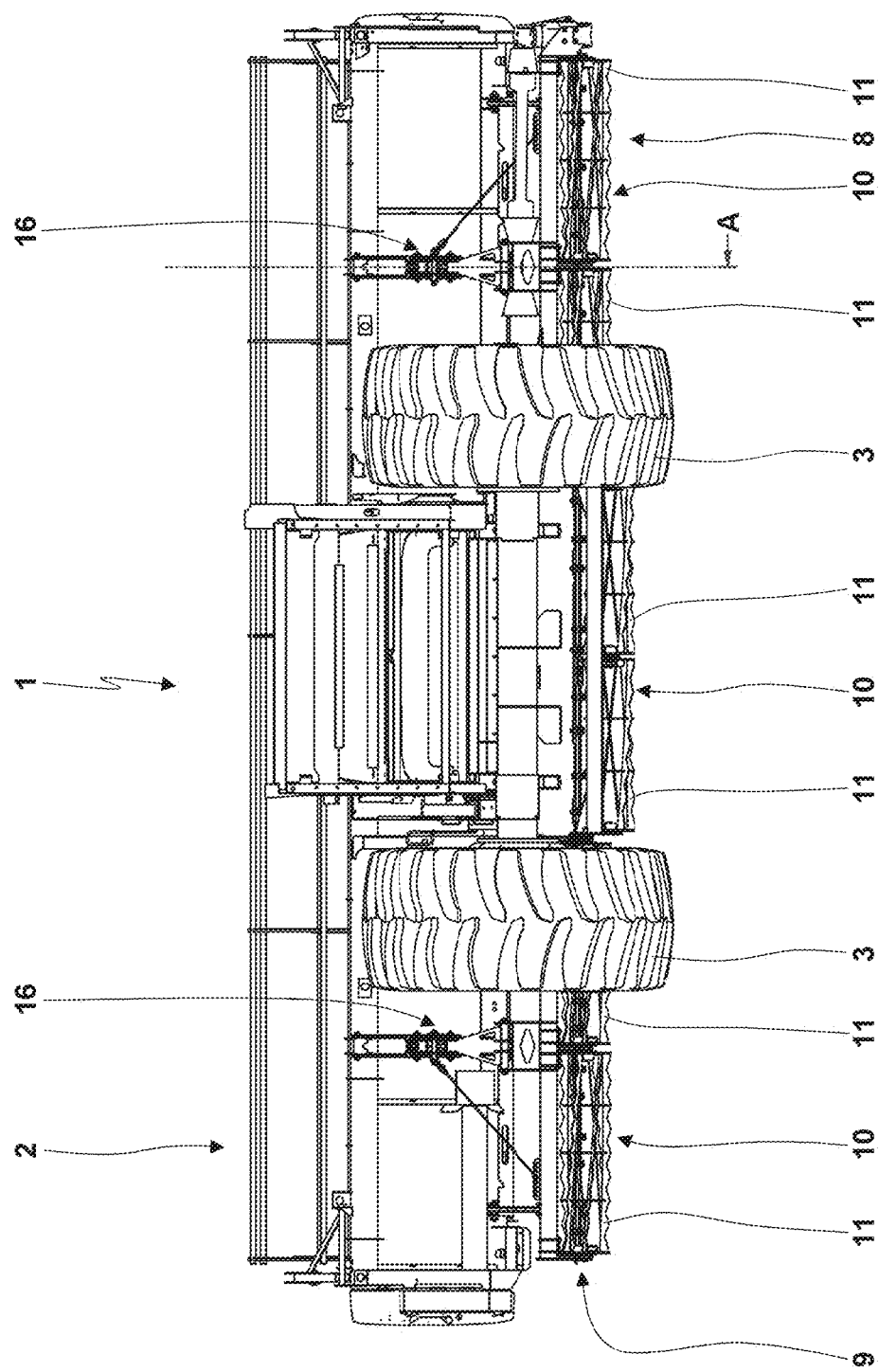
FIG. 3 shows a rear view of the header in its lifted position.
Figure 5:
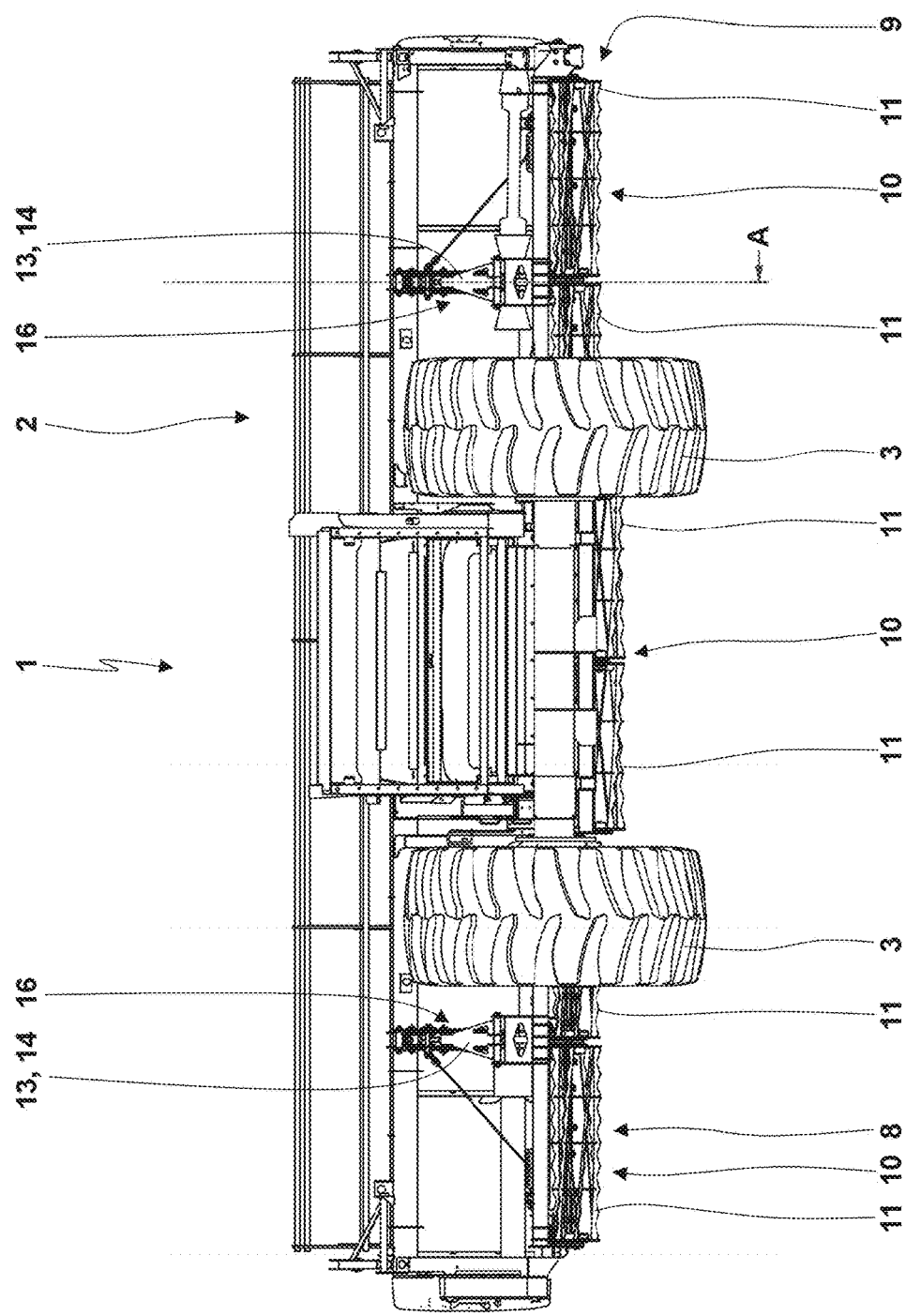
FIG. 5 shows a rear view of the header in its lifted position with the secondary implement lifted relative to the primary implement.
Figure 6:
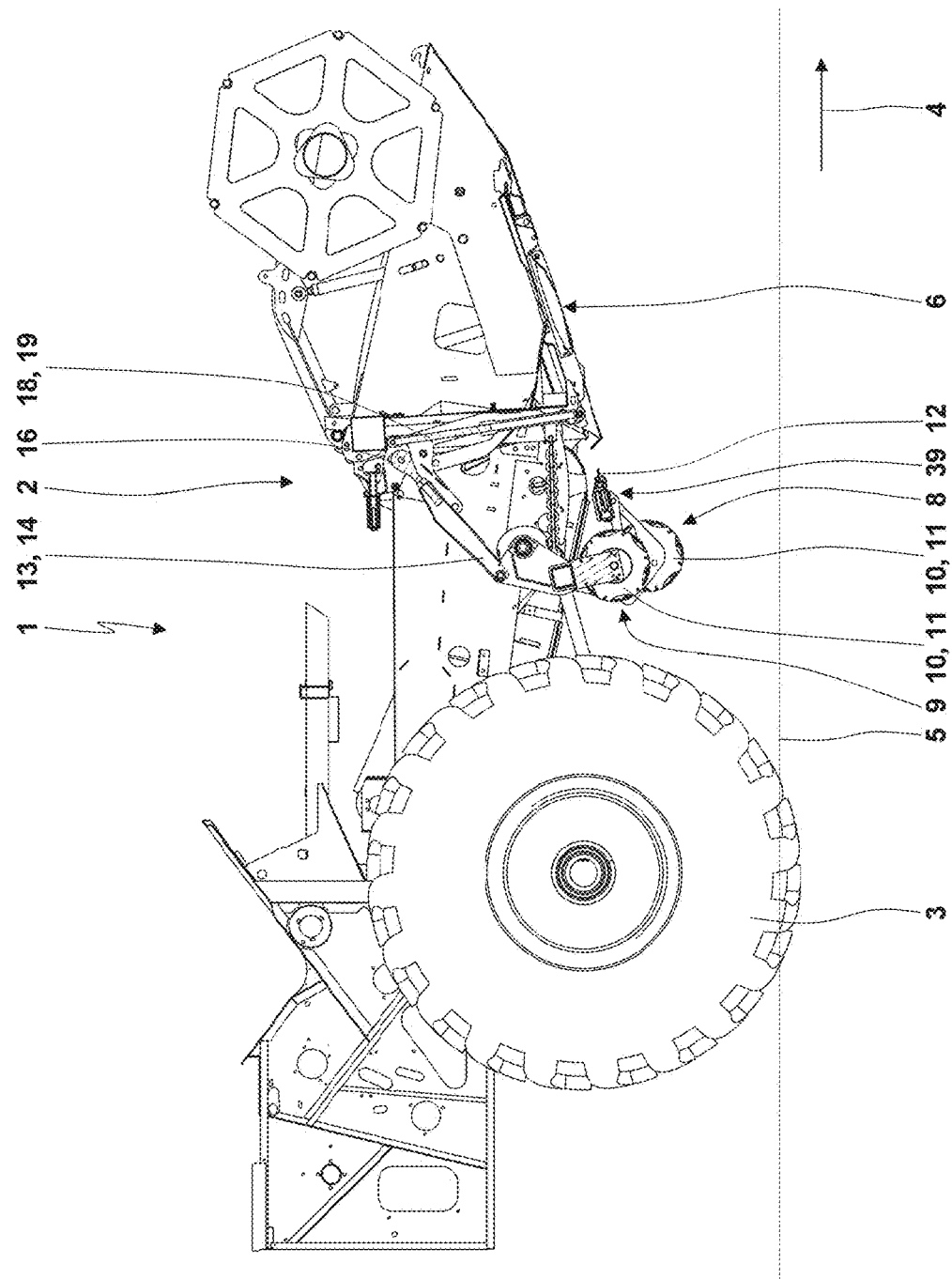
FIG. 6 shows a sectional view of the header according to line A-A in FIG. 5.
Figure 7:
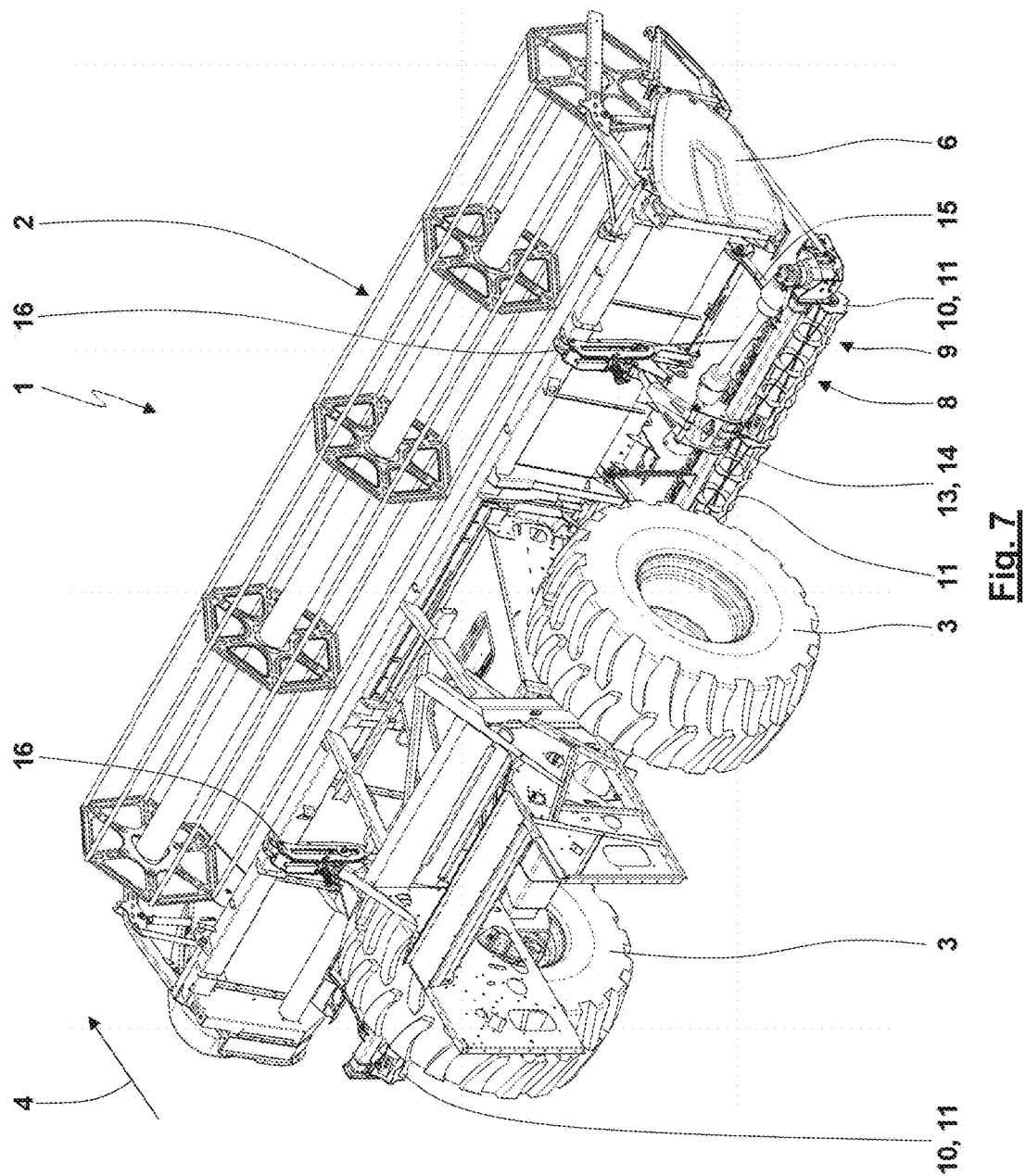
FIG. 7 shows a perspective view of the header and a part of the combine harvester.

FIGS. 1-7 show various views of the operating conditions of the header 2. FIGS. 1 and 2 show the operational position, FIGS. 3 and 4 a partly lifted position, and the FIGS. 5 and 6 the completely lifted position. FIG. 7 shows a perspective view of the header 2 in its operational position.

In order to improve the legibility of the drawings, not all reference signs have been reproduced in all drawings. This concerns mainly the repeated representation of identical components in different positions.

Secondary Implement

Besides the primary implement 6, the combine harvester 1 has a, in particular modularly designed, secondary implement 8. In this embodiment, it is designed as a cutting unit and serves for cutting the crop stubbles of the cut crop left standing by the primary implement 6 on the ground 5. When moving the combine harvester 1 in the direction of travel 4, therefore, the crops are first cut by the primary implement 6 at a greater height above the ground 5. Then during the further travel all the remaining stubbles are cut down and/or up by the secondary implement 8 nearer to the ground 5.

The secondary implement 8 has a roller unit 9 with a plurality—here, three—of roller sets 10. In the present case, each roller set 10 has two rollers 11, but could also have more or fewer rollers 11. The secondary implement 8 therein is supported on the ground 5 by means of the roller unit 9 and/or is moved by this unit during the harvesting operation of the combine harvester 1. The rollers 11 are designed in a cage-like manner and, in particular, consist of metal. The rollers 11 provide the secondary implement 8 with a good guidance, also in the case of difficult soil conditions—e.g. rocks, holes, slopes, etc.

The secondary implement 8, here configured as a cutting unit, has knife bars with blades 12 attached thereto. The cutting unit, and particularly the blades 12, can be easily damaged, which, however, is prevented by what is described below.

The secondary implement 2 is connected to a link 13. The link 13 here is shown as an upper link 14. Also a lower link 15 is provided for further fixing.

Lifting Device

The new header 2 has a lifting device 16 that is designed and connected by means of a link bearing 17 to the link 13, such that a translational movement of the link bearing 17 causes a lifting of the secondary implement 8 relative to the primary implement 6.

For this purpose, the lifting device 16 has an actuating device 18 which is designed here as a piston-cylinder unit 19. The piston-cylinder unit 19 has a piston 35 that is driven to make a reciprocating movement in a cylinder 36. This piston-cylinder unit 19, through the translational movement of the piston 35, causes a translational movement of the secondary implement 8 so that it is lifted up.

From FIGS. 1 and 2 it can be seen that, in the operating condition of the combine harvester 1 shown here, the secondary implement 8 is located substantially below primary implement 6 and thus nearer to the ground. This enables the cutting down of the stubbles left standing by the primary implement 6.

Figure 4:
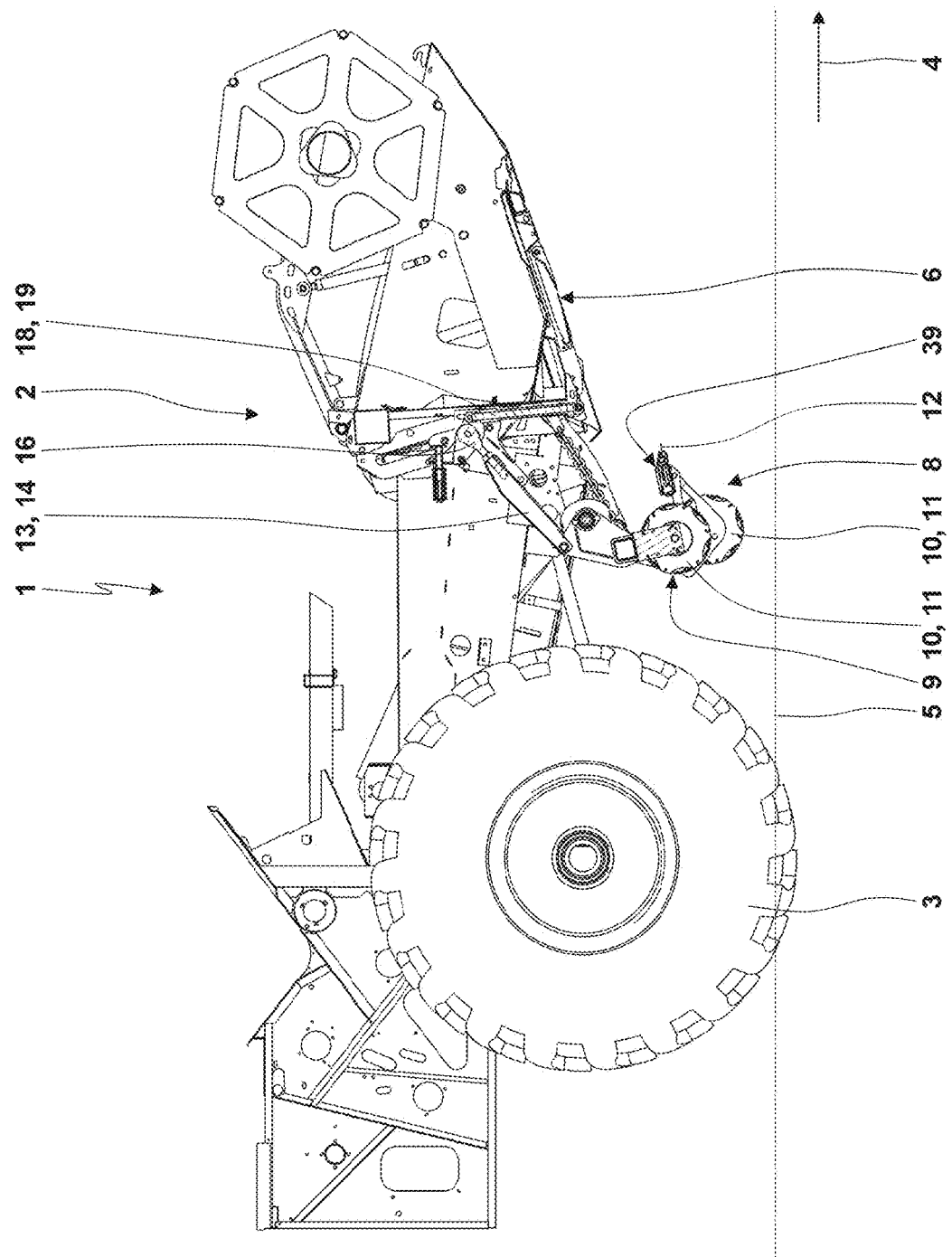
FIG. 4 shows a sectional view of the header according to line A-A in FIG. 3.

Now, if the header 2 is brought into the lifted position shown in FIGS. 4 and 6, then the distance between the lower surface of the primary implement 6 and the ground 5 is sufficient for passing over trenches and similar impediments. But, as the secondary implement 8 is situated much lower, there is a risk of damage.

In order to prevent this type of damage, the secondary implement 8 can now be lifted relative to the primary implement 6 and brought into its lifted position as shown in FIGS. 5 and 6. In this position, the sensitive part of the cutting unit and, in particular, the blades 12 are positioned at a level above the lower exterior surface of the primary implement 6, so that the blades 12 are protected when crossing impediments by this lower exterior surface.

Figure 8:
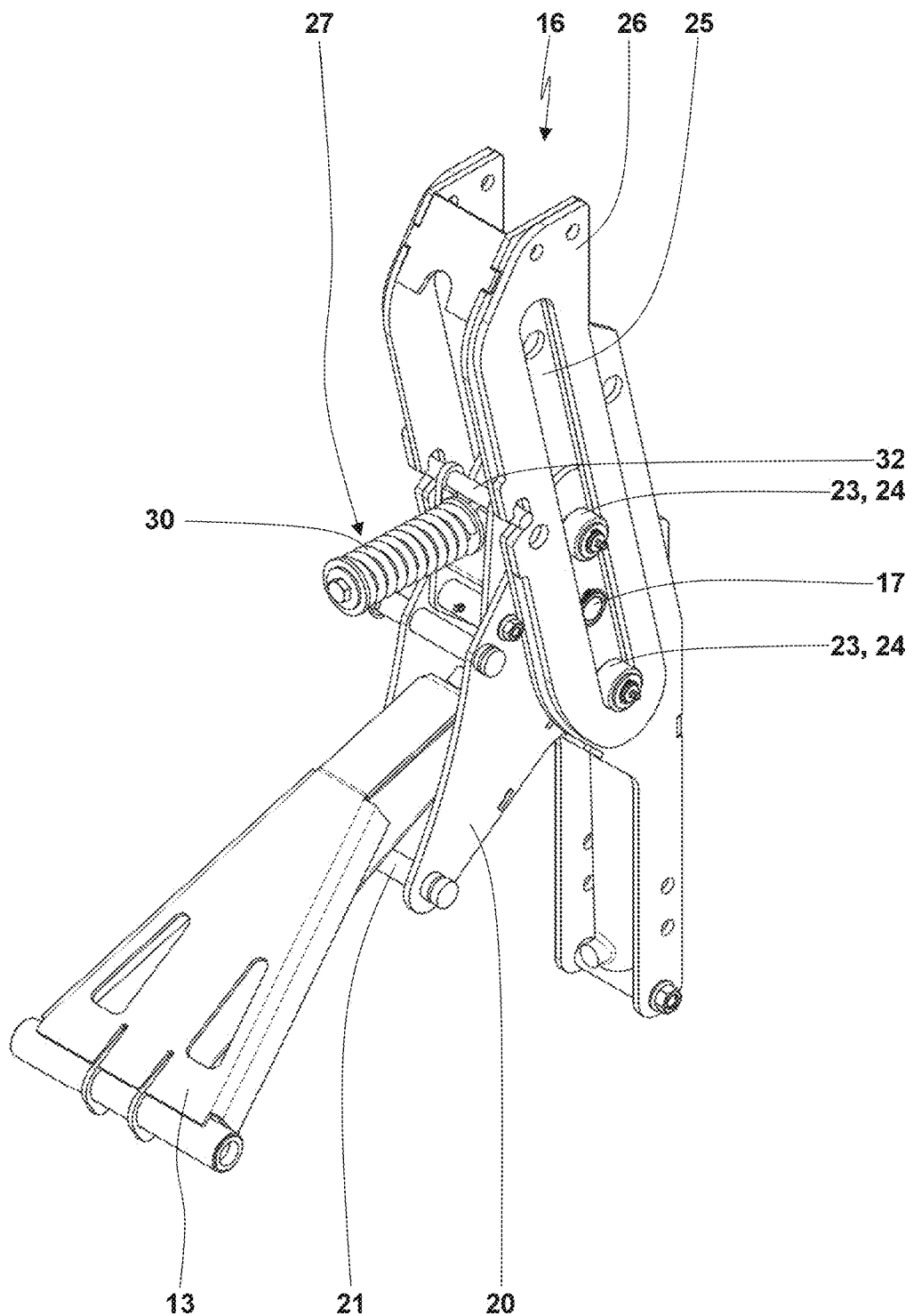
FIG. 8 shows a perspective view of a first exemplary embodiment of the new lifting device of the new header with a safety device in the safety position.
Figure 9:
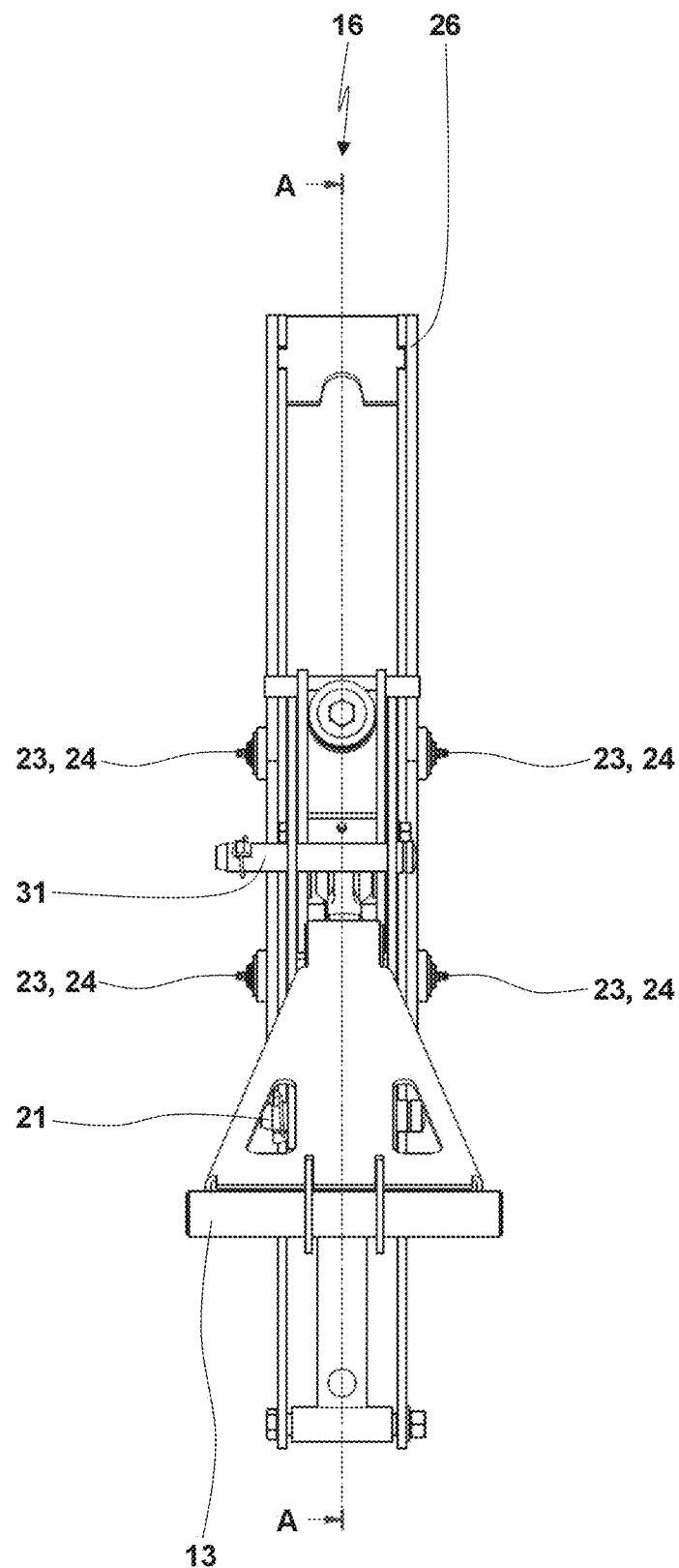
FIG. 9 shows a rear view of the lifting device according to FIG. 8.
Figure 10:
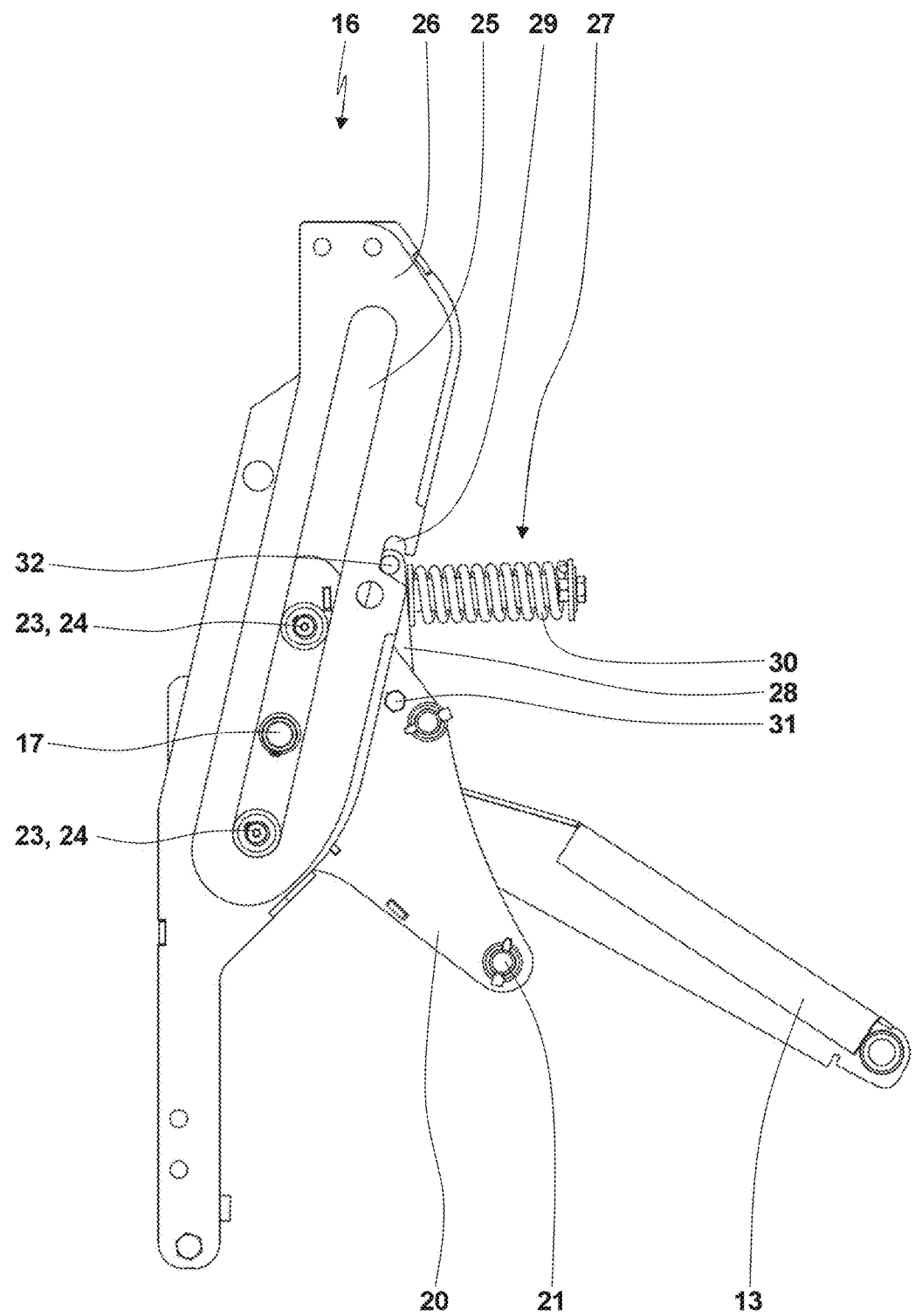
FIG. 10 shows a side view of the lifting device according to FIG. 8.
Figure 11:
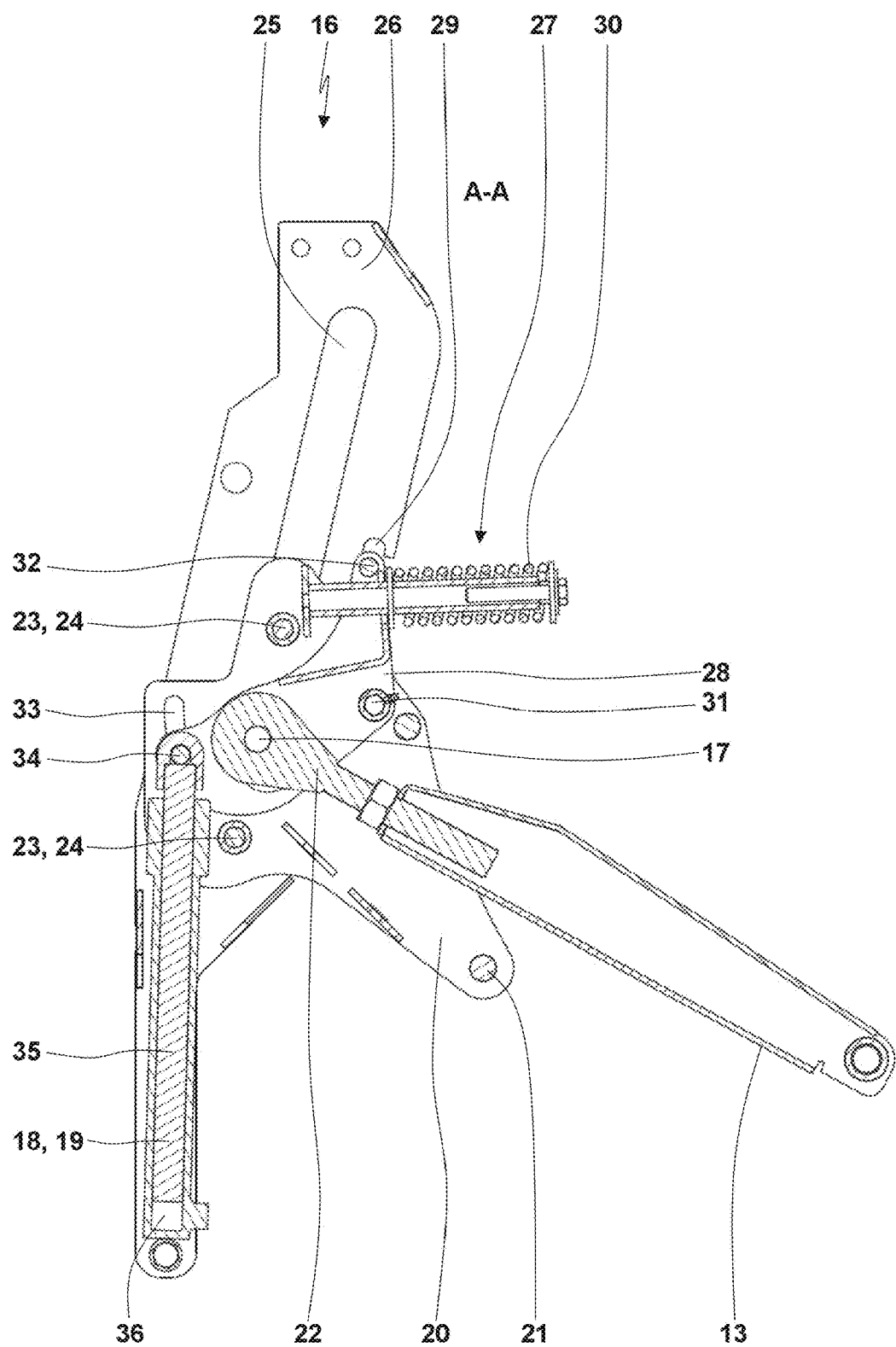
FIG. 11 shows a sectional view of the lifting device according to line A-A in FIG. 9.
Figure 12:
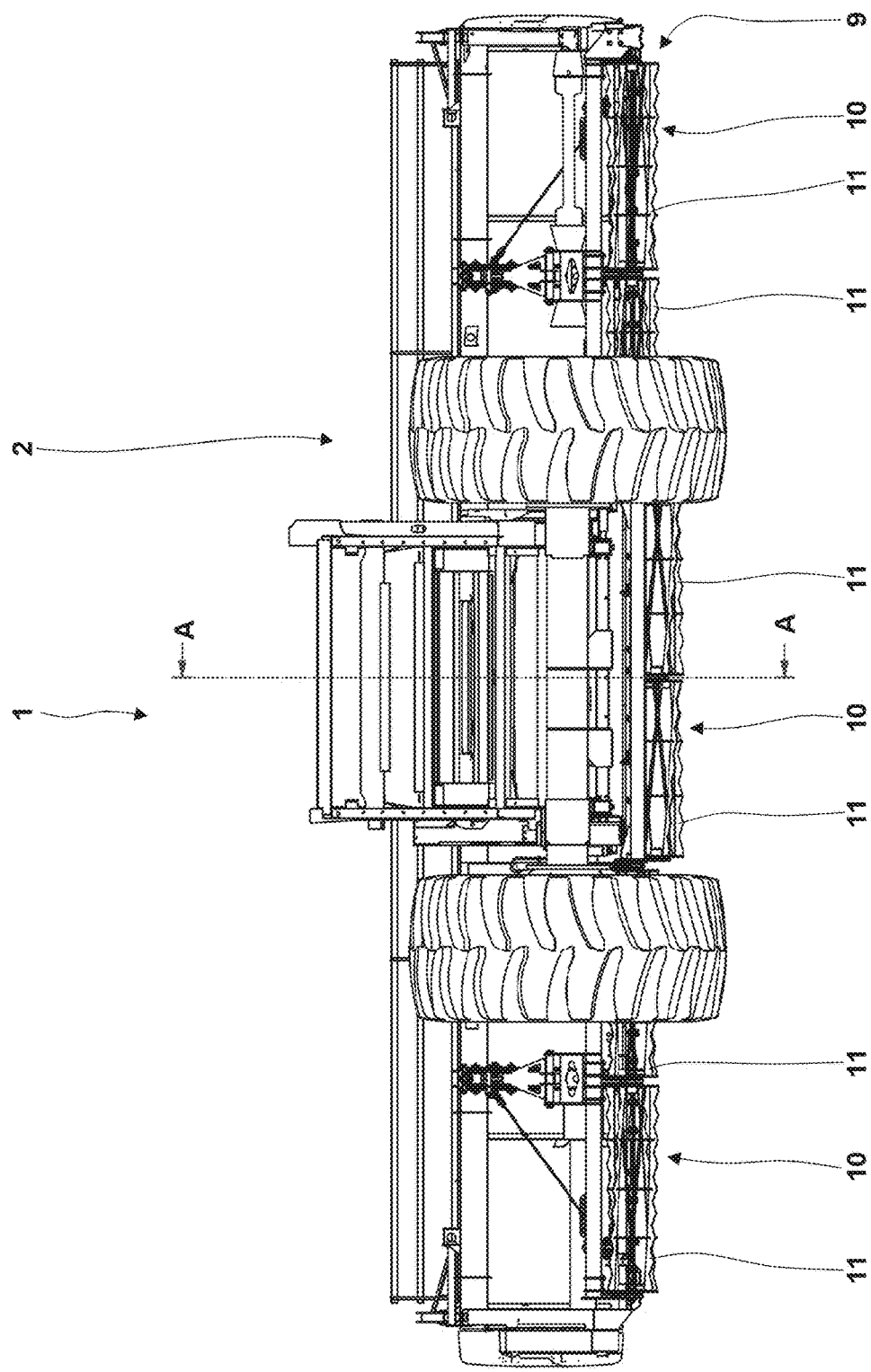
FIG. 12 shows a rear view of the header in its lifted position with the secondary implement lifted relative to the primary implement.
Figure 13:
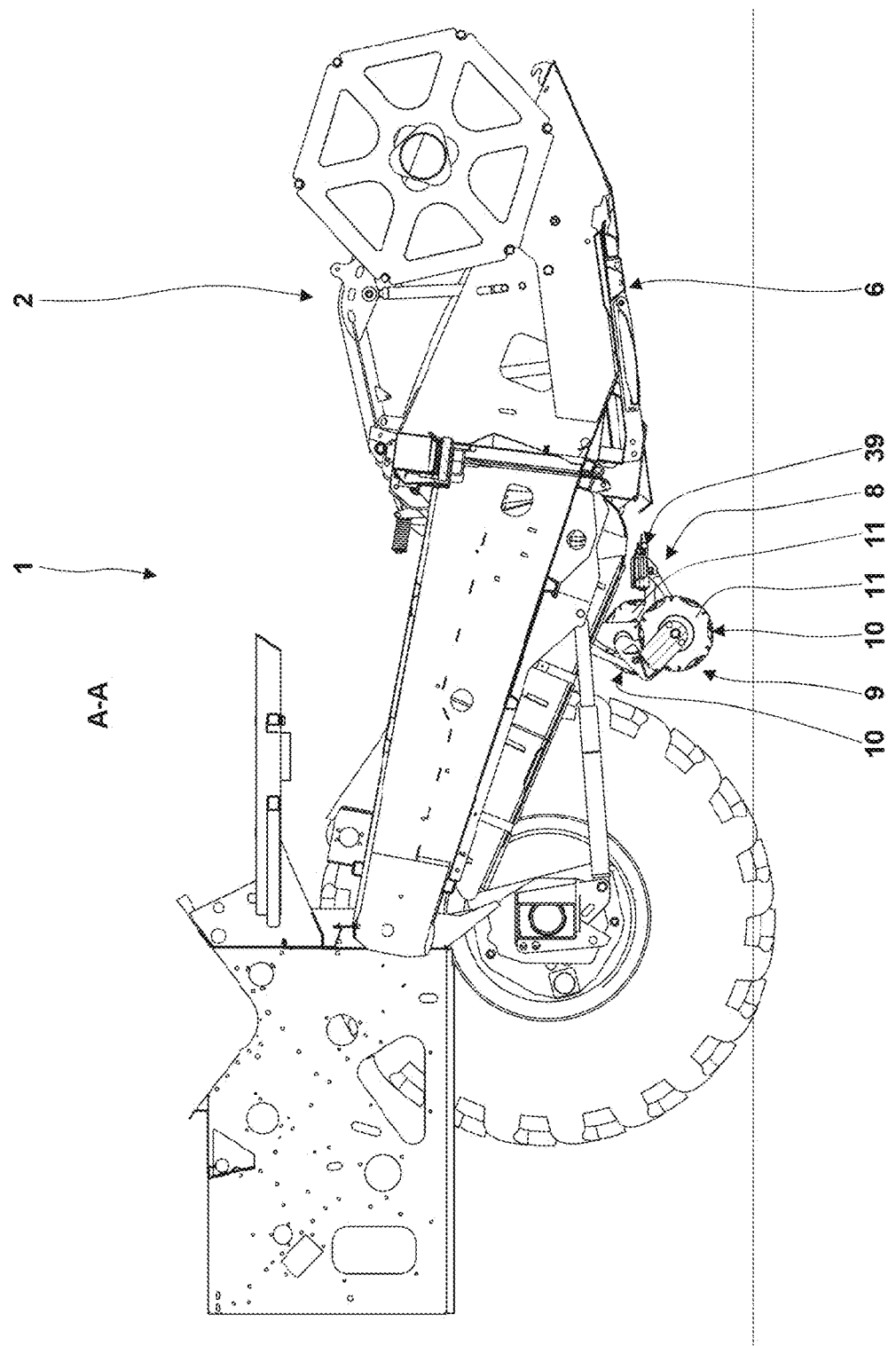
FIG. 13 shows a sectional view of the header according to line A-A in FIG. 12.
Figure 14:
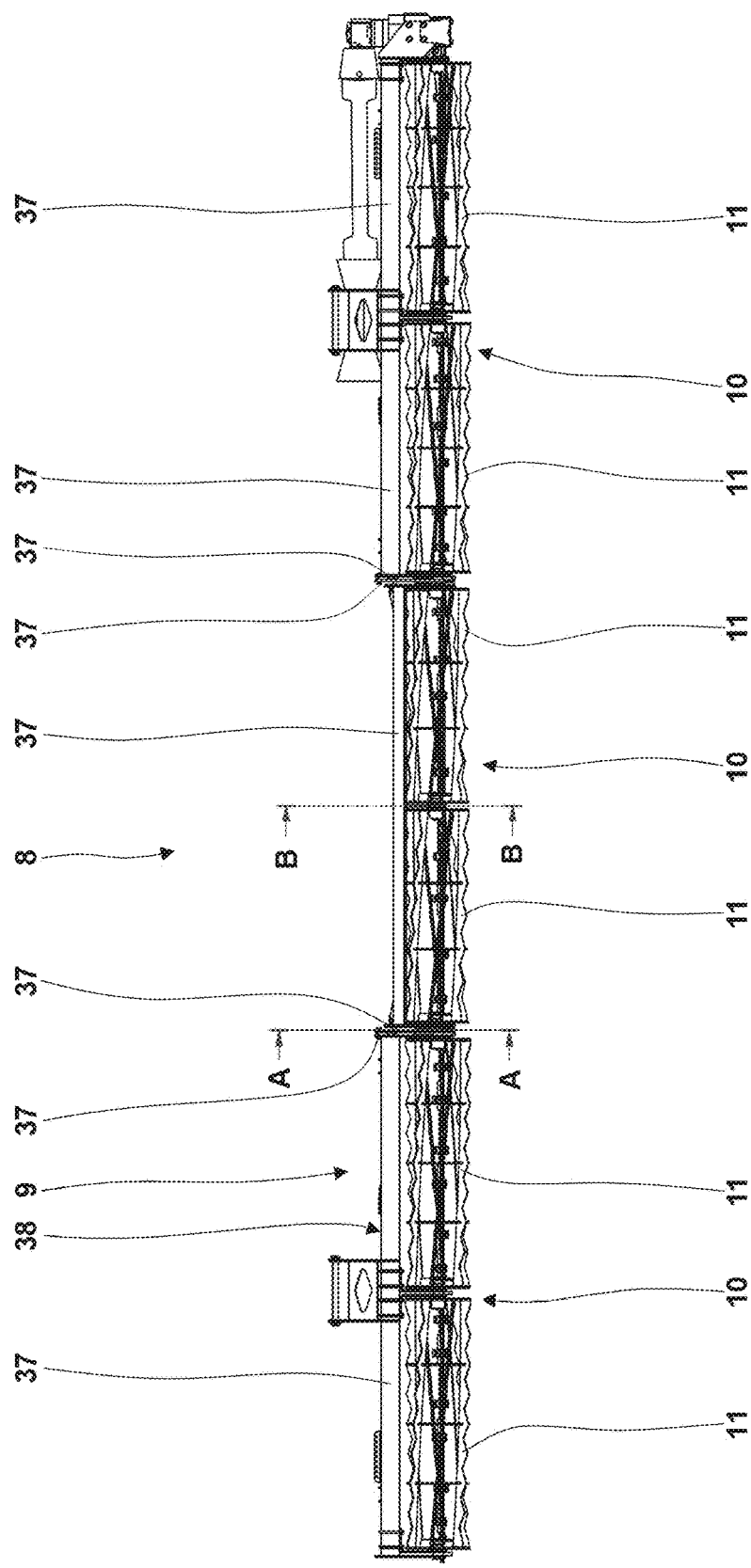
FIG. 14 shows a rear view of the secondary implement with the central roller set in a non-lowered position.

FIGS. 8-10 show various views of an embodiment of the lifting device 16. In the described example, the header 2 has two lifting devices 16 of this type, which are provided to the header 2. But it could also be provided with only one lifting device 16, or also three or more lifting devices 16.

The lifting device 16 has a slide element 20 and a stop or contact point 21 that is here formed as a pin. The gravity dependent contact with the link 13 passes over said contact point 21. The permanently rotatable connection between the link 13 and the lifting device 16 is achieved by means of a coupling part 22 and the link bearing 17. The coupling part 22 is rotatably connected via the link bearing 17 to the slide element 20.

The slide element 20 has guide elements 23 that are designed here as guide rollers 24. But, for example, these could also be pins. The guide elements 23 engage in a guiding slot 25 of a guide component 26. The guide component 26 is fastened to the rear side of the primary implement 6.

Safety Device

The lifting device 16 further has a safety device 27. The safety device 27 has a safety latch 28, a safety slot 29 and a safety spring 30. The safety spring 30 presses the safety latch 28 into the safety slot 29, while the safety latch 28 is rotatably connected via a bearing 31 with the slide element 20. Herein, the safety latch 28 is connected to a safety pin 32, which then finally sits in the safety slot 29.

The slide element 20 further has a track-shaped release slot 33 which guides a pin 34. The pin 34 is connected with the actuating device 18 as well as with the safety latch 28.

FIGS. 8-11 show the safety position of the safety device 27 of the lifting device 16.

The secondary implement 8 touches the ground 5 and the link 13 is not touching the contact point 21. In this way, no weight force is transferred. The safety spring 30 presses the safety latch 28 with its safety pin 32 into the safety slot 29. The actuating device 18 is situated in its lowered position and the pin 34 is situated in the lower region of the release slot 33.

The safety device 27 further has a release position, a released position, a partly lifted position and a maximal lifted position, but these are not described in more detail in the present application.

Lowerable Central Roller Set

As shown in particular in FIGS. 12-26, the new header 2 for the combine harvester 1 is designed to lower the central roller set 10 with respect to the—in this embodiment—two outer roller sets 10, when the header is lifted.

The secondary implement 8 has several frame elements 37, which, collectively, form a frame 38 of the roller unit 9 and are connected to the primary implement 6 by means of the links 13, 15 and the lifting device 16. In addition to the roller unit 9, the secondary implement 8 has a cutting unit 39. Here the cutting unit 39 is formed exactly by a knife bar with upper and lower knives, extending over the entire working width 7 of the secondary implement 8. But, the knife bar also could be modular. The implement 8 may also comprise another processing unit.

Figure 15:
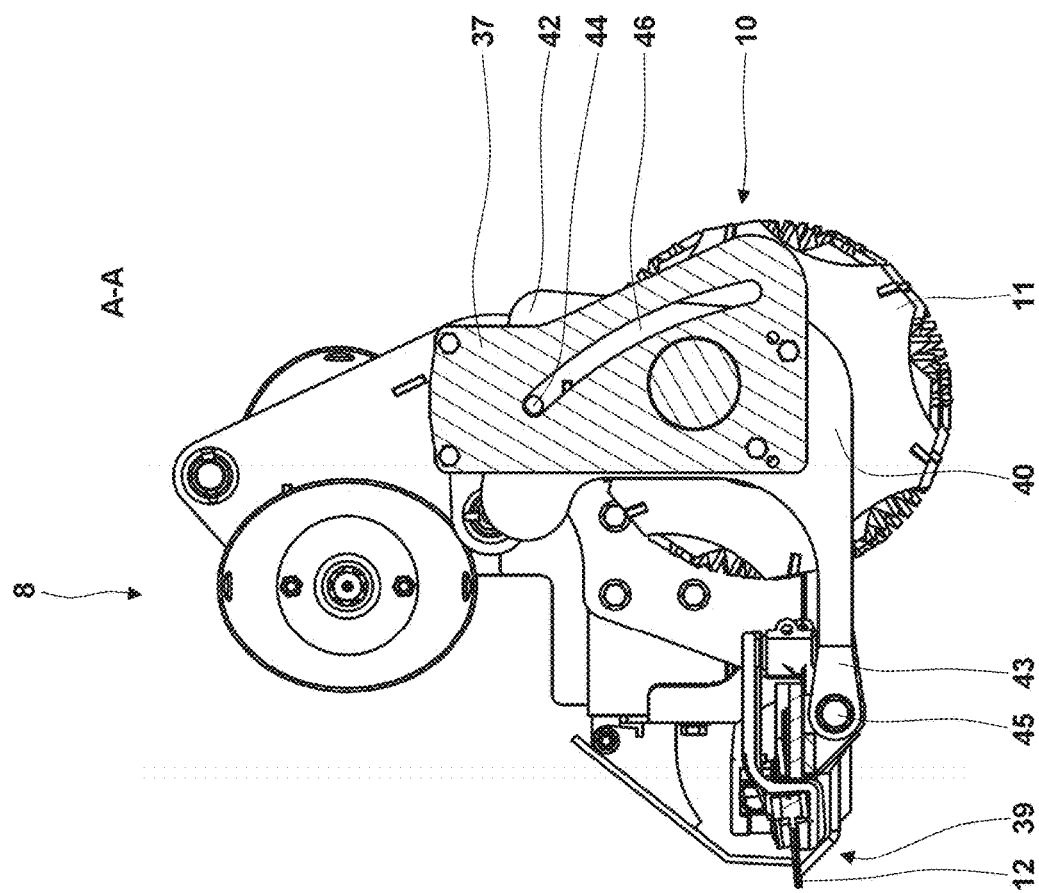
FIG. 15 shows a sectional view of the header according to line A-A in FIG. 14.
Figure 16:
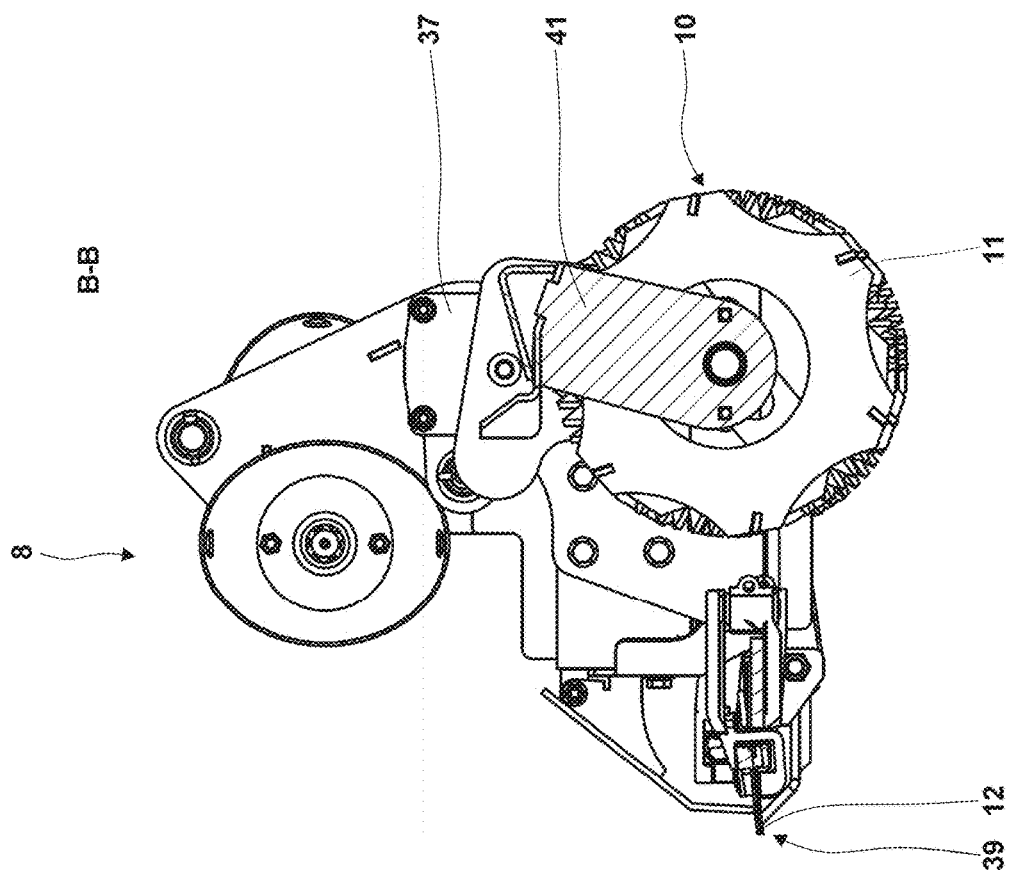
FIG. 16 shows a sectional view of the secondary implement according to line B-B in FIG. 14.
Figure 17:
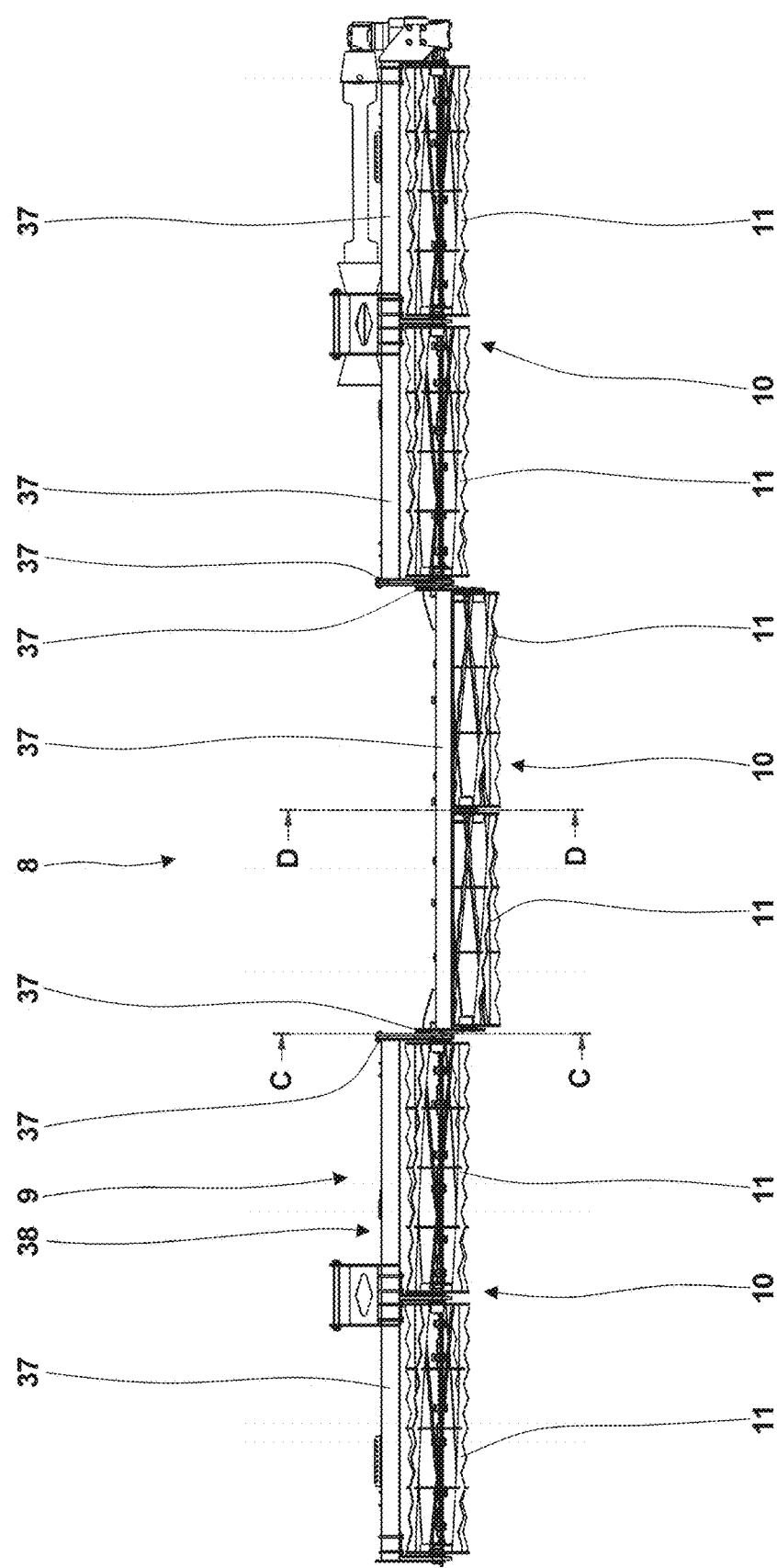
FIG. 17 shows a rear view of the secondary implement with the central roller set in the lowered position.
Figure 18:
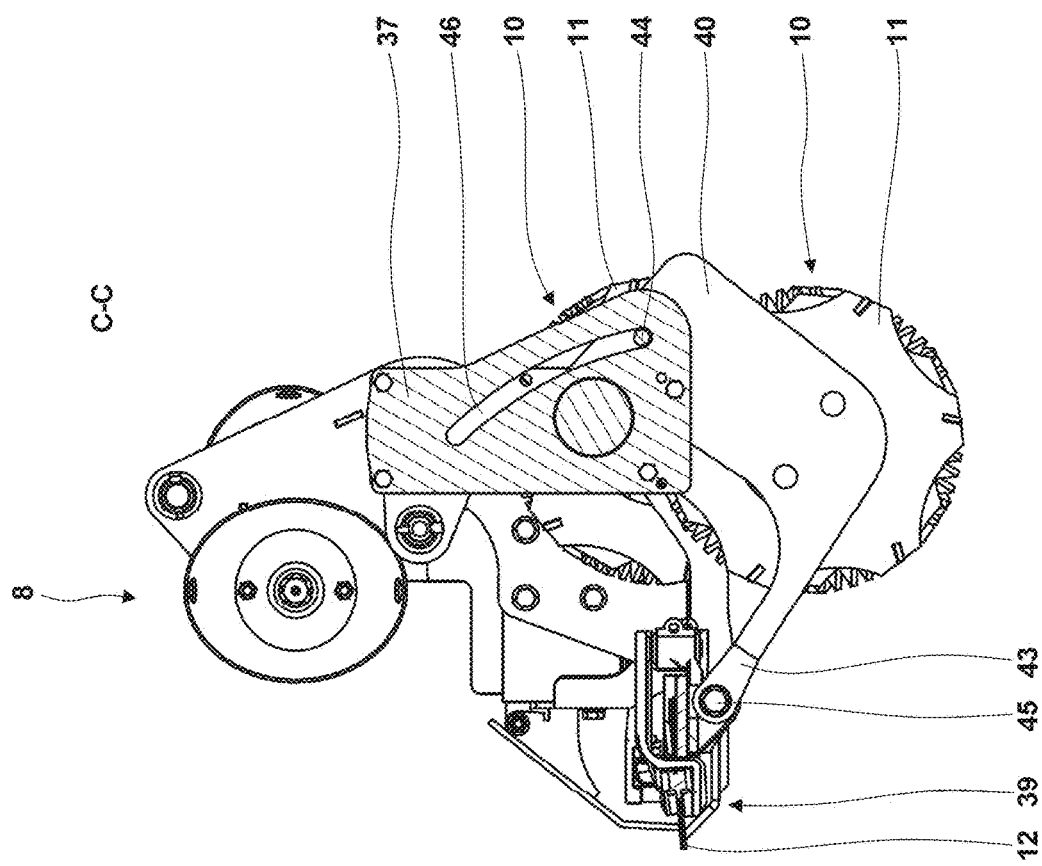
FIG. 18 shows a sectional view of the secondary implement according to line C-C in FIG. 17.
Figure 19:
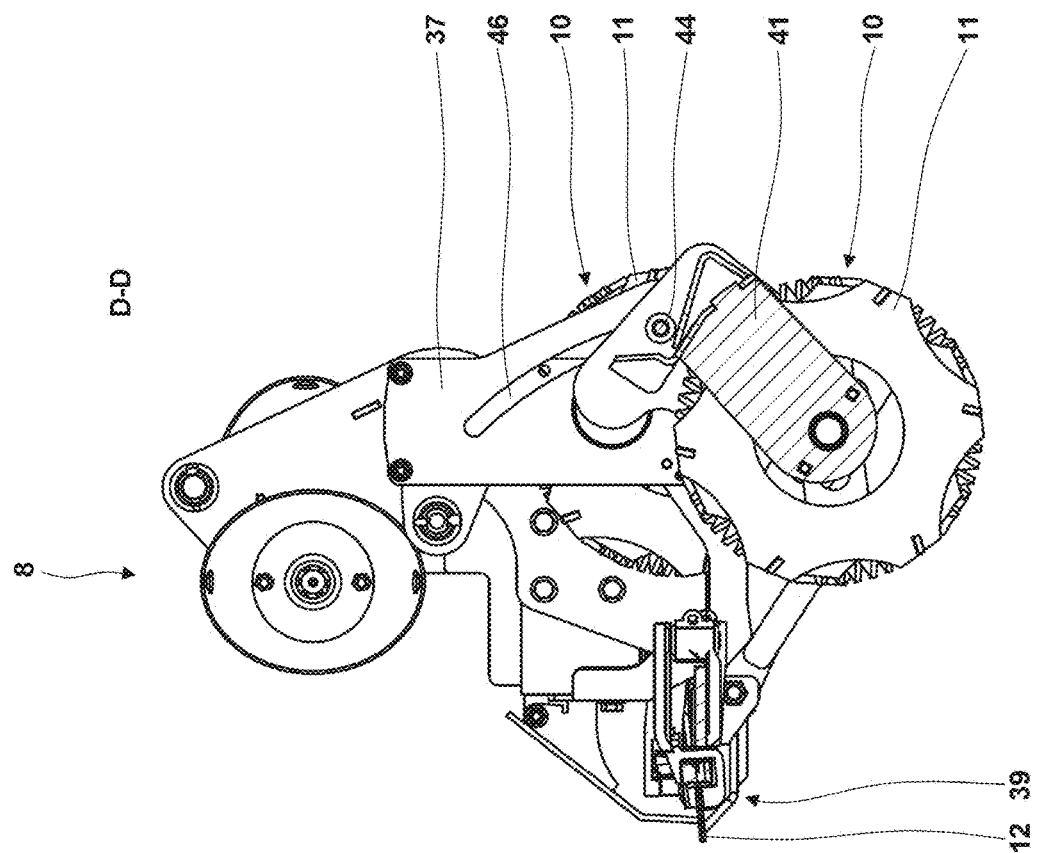
FIG. 19 shows a sectional view of the secondary implement according to line D-D in FIG. 17.
Figure 20:
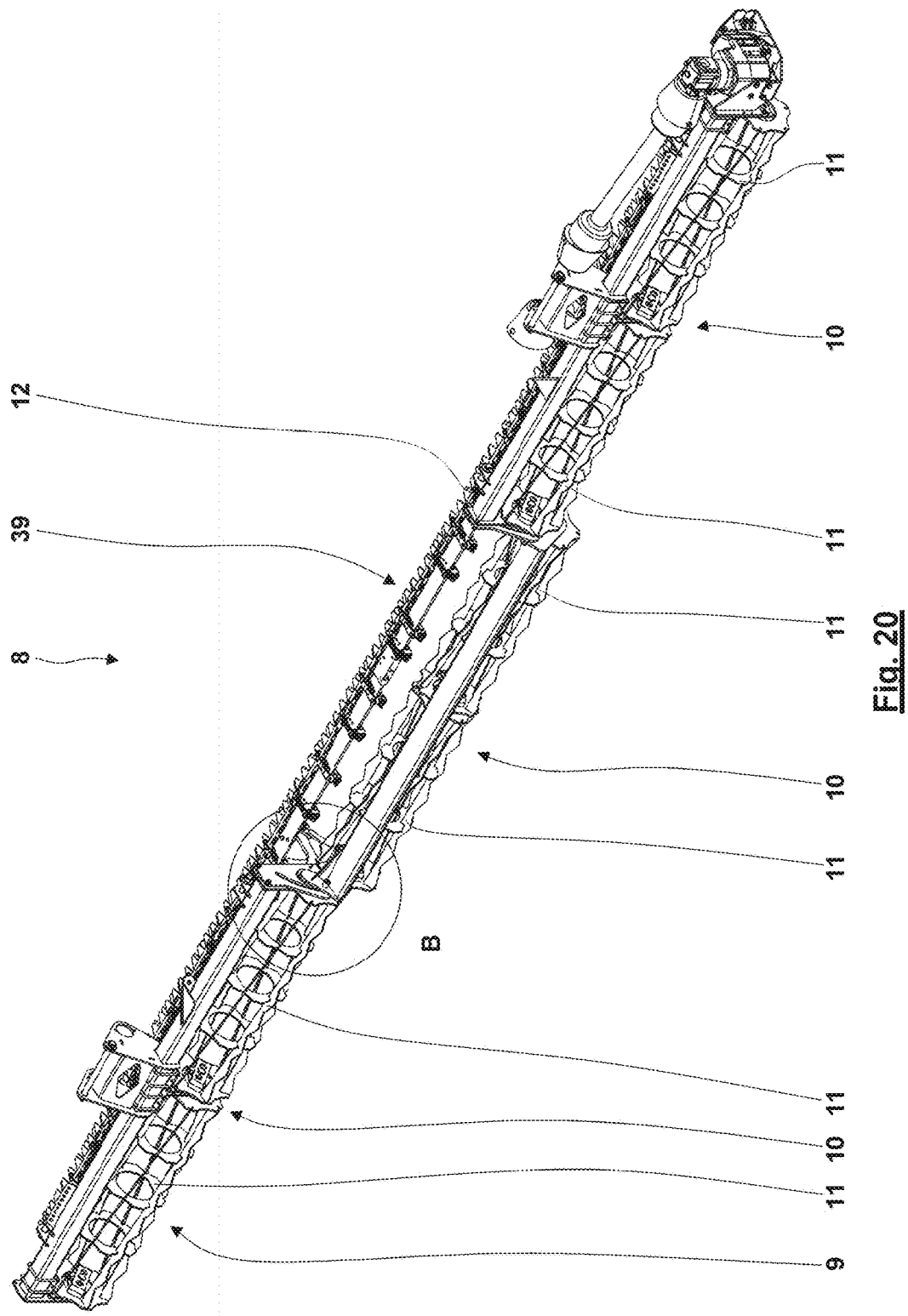
FIG. 20 shows a perspective view of the secondary implement with the central roller set in the lowered position.
Figure 21:
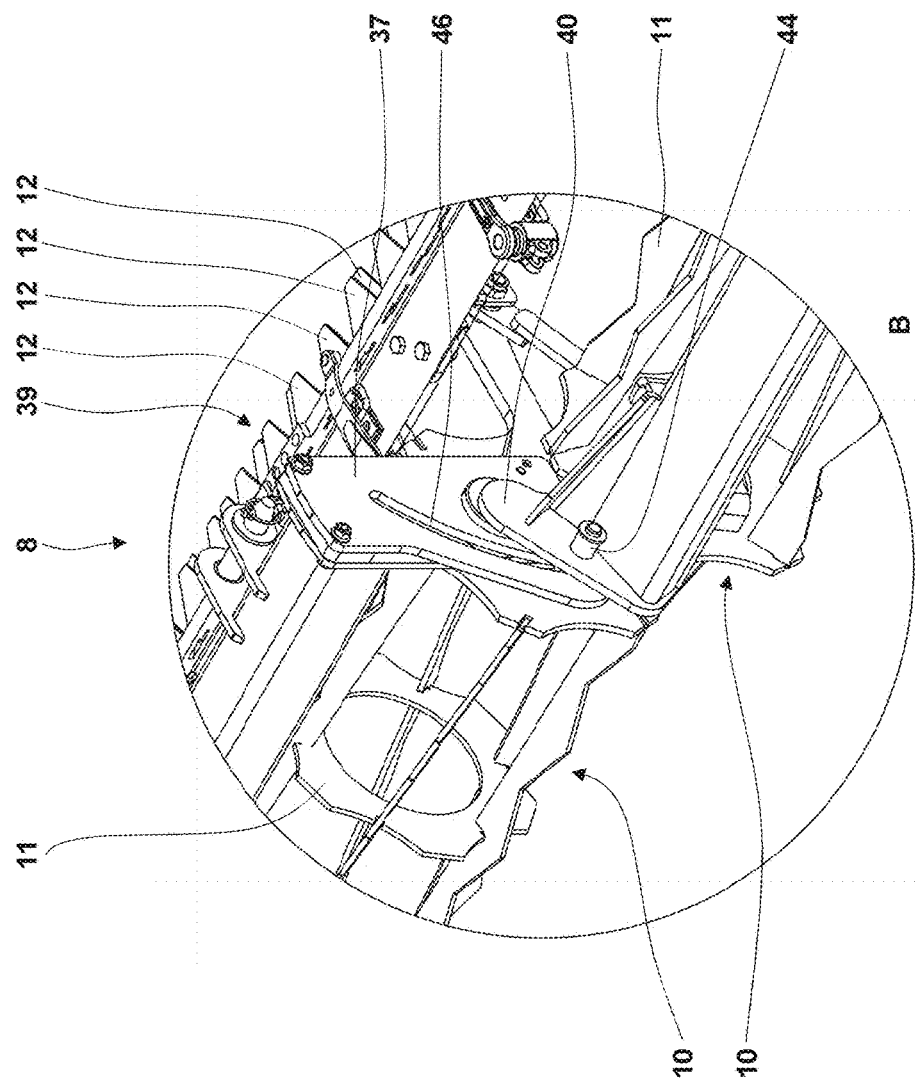
FIG. 21 shows the detail B of FIG. 20.

As shown in particular in FIG. 15, the central roller set 10 has two side plates 40, with the rollers 11 arranged in between. Hence, these side plates 40 limit and define the respective roller set 10. Between the rollers 11 of the roller set 10 an intermediate plate 41 has been mounted (see FIG. 16). Both side plates 10 are generally L-shaped and have a first limb 42 and a second limb 43. On the first limb 42, a guide element 44 is mounted, that, for instance, can be designed as a guide pin or as a guide roller. On the second limb 43, a bearing 45 is mounted, that, for instance, can be designed as a pivot bearing. In this way, the bearing 45 is arranged under the cutting unit 39 and at a certain distance from the rollers 11.

The segment of the frame element 37 provided near both side plates 40 has a guiding slot 46. The guiding slot 46 has the form of an arc of a circle, but, it also could have another shape. The guide element 44 engages in the guiding slot 46 of the frame element 37 and can be moved therein under certain conditions. Doing this, the roller unit 10 pivots about the bearing 45. In FIG. 15 it can be seen that the guide element 44 has been positioned at the upper end stop of the guiding slot 46. This means that the roller set 10 is not lowered, as is the case when the roller unit 9 of the secondary implement 8 is resting on the ground 5.

Now, FIGS. 17-23 show the roller set 10 in its lowered position. It can be seen that the guide element 44 now is at the lower stop of the guiding slot 46. This means that the guide element 44 has traversed the guiding slot 46, while the roller unit 10 has pivoted about bearing 45 and has been lowered with respect to the other roller sets 10. This is the case when the secondary implement 8 has been lifted and the roller unit 9 is not supported on the ground anymore.

Figure 22:
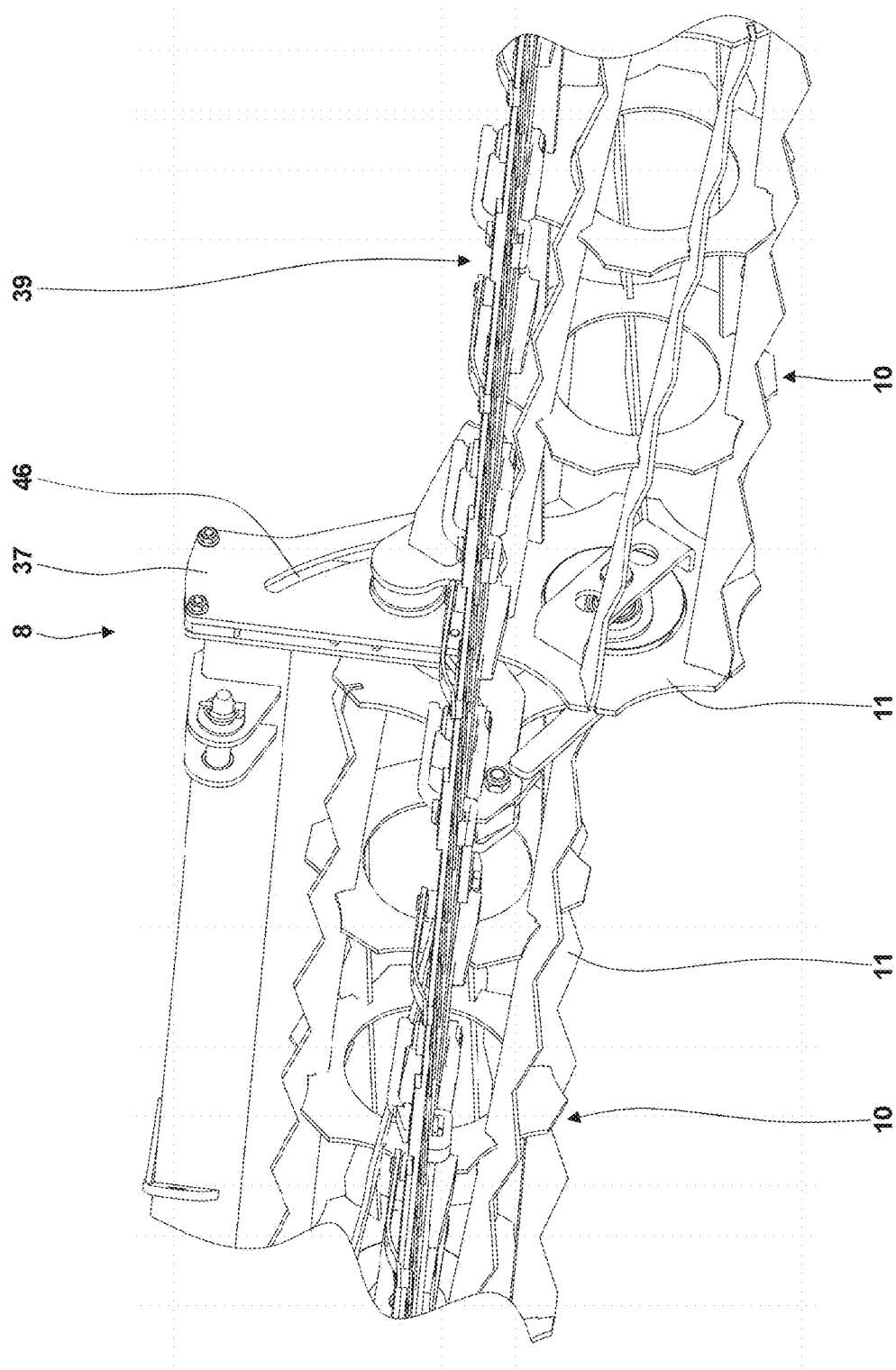
FIG. 22 shows another perspective front view of the secondary implement with the lowered roller set.

FIG. 22 shows in its left half the left end of an outer roller set 10—seen from the front—and in its right half, the nearby arranged right end of the lowered central roller set 10.

Figure 23:
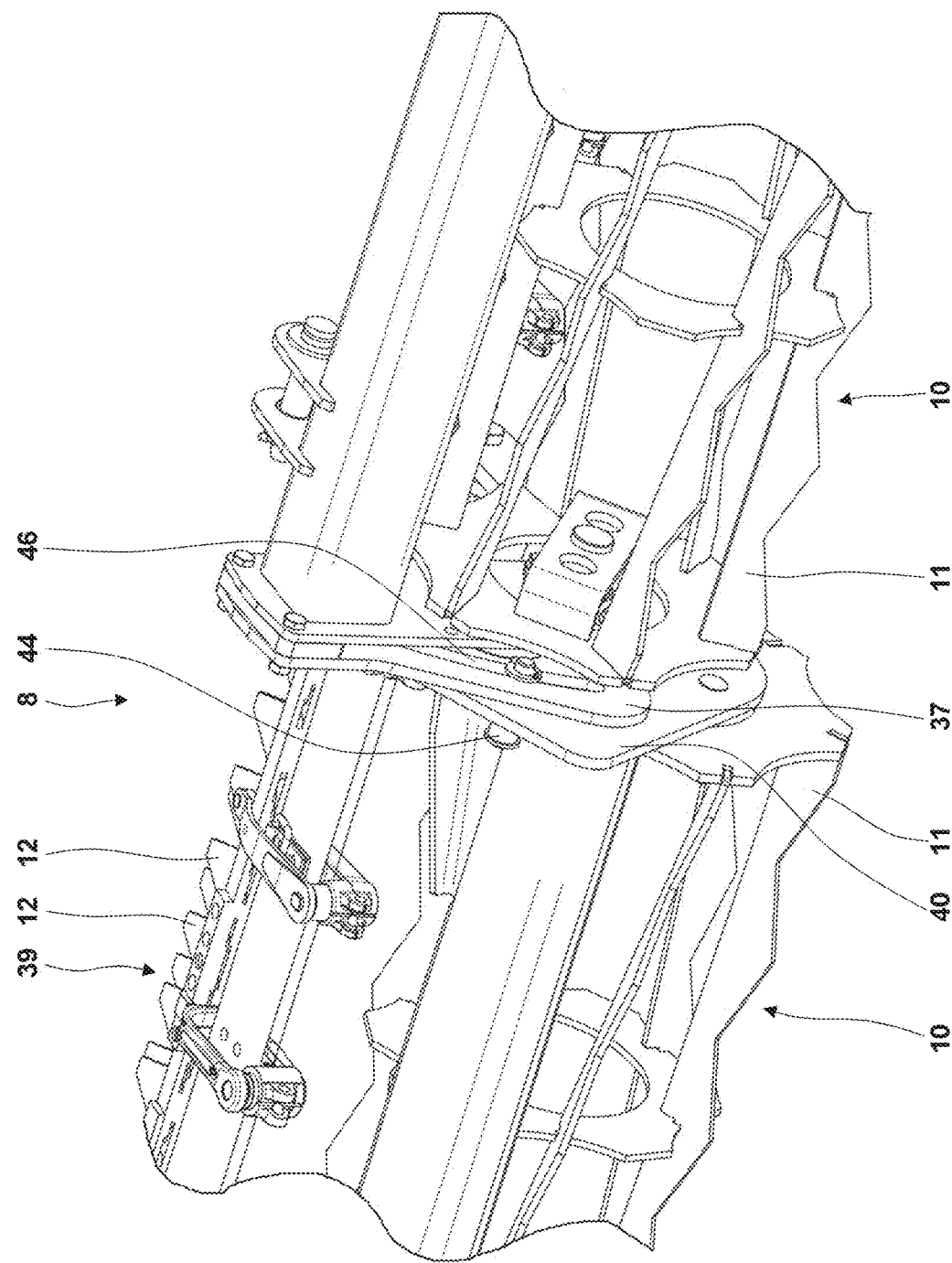
FIG. 23 shows another perspective rear view of the secondary implement with the lowered roller set.
Figure 24:
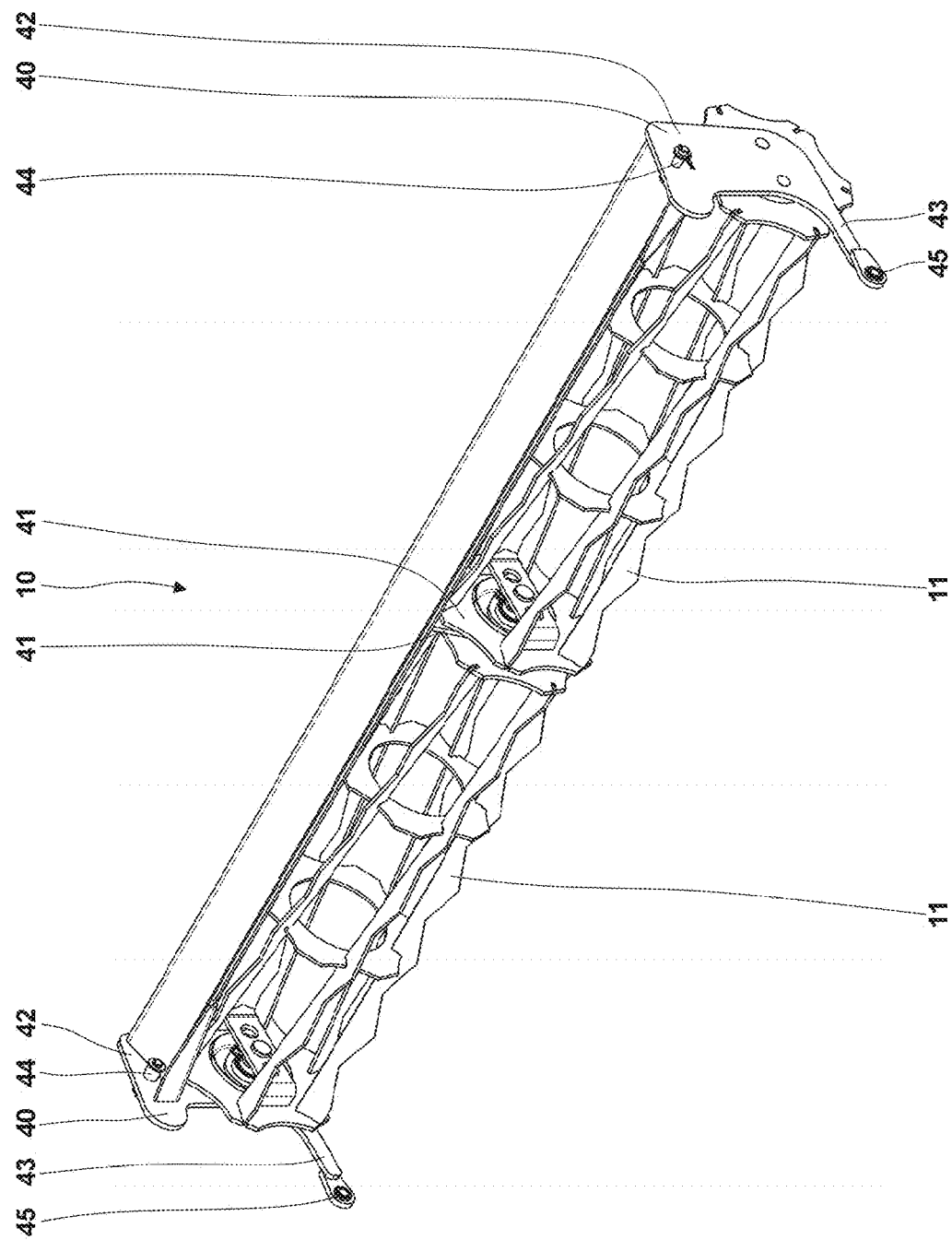
FIG. 24 shows a perspective front view of a central roller set.
Figure 25:
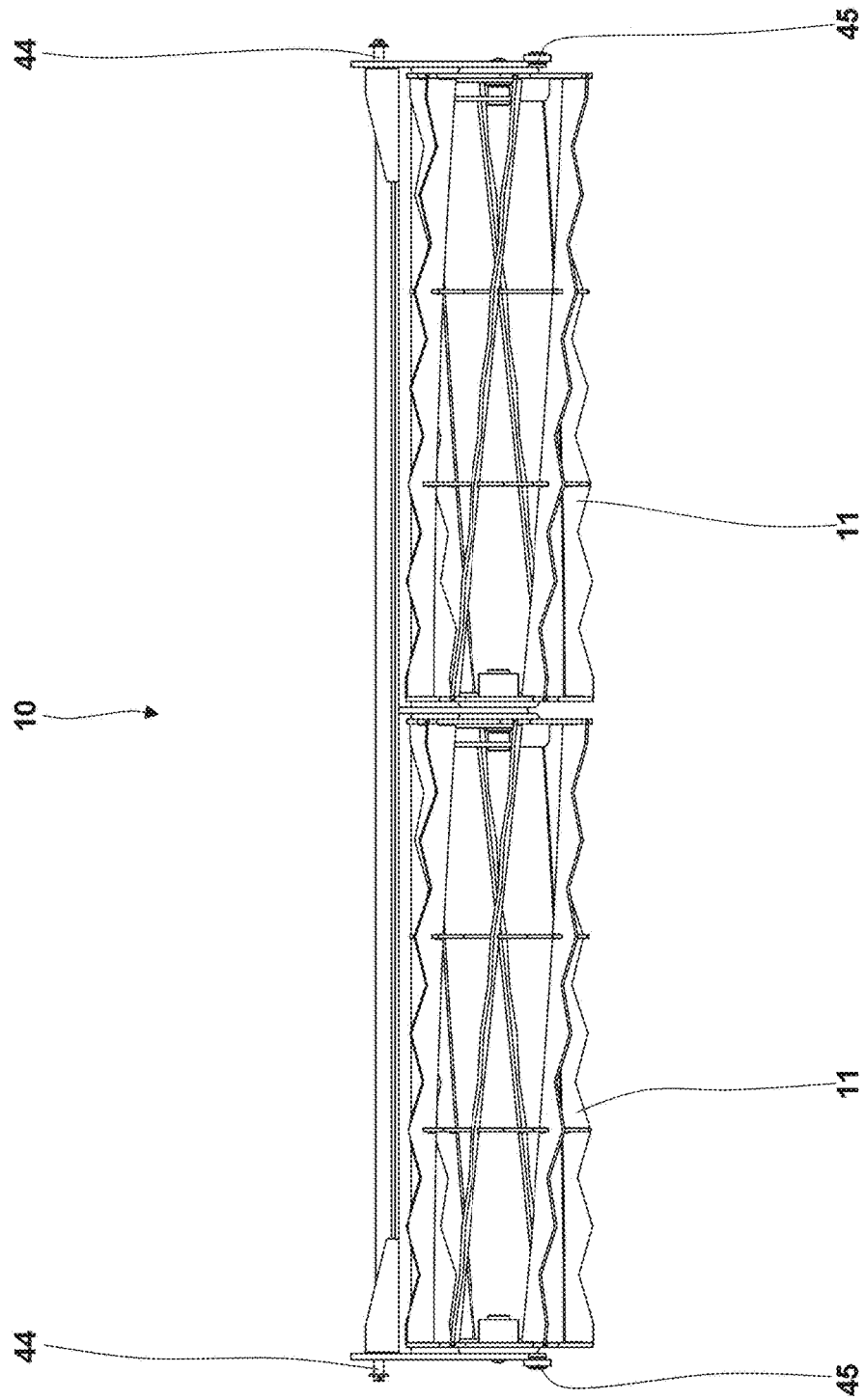
FIG. 25 shows a top view of the central roller set according to FIG. 24.
Figure 26:
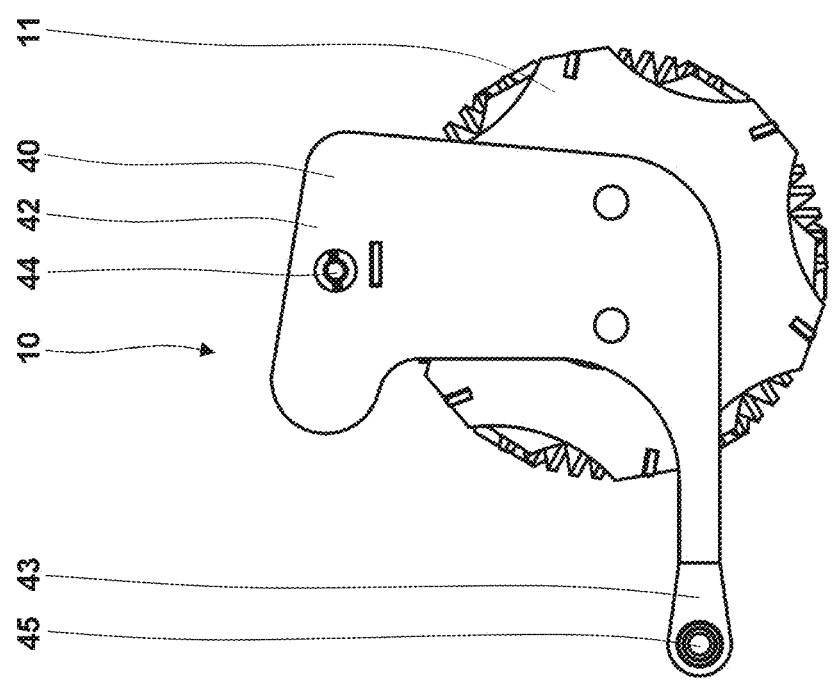
FIG. 26 shows a side view of the central roller set according to FIG. 24.

FIG. 23 shows in its left half the right end of the lowered central roller set 10—seen from the rear—and, nearby, in its right half, the left end of the outer central roller set 10.

Figure 27:
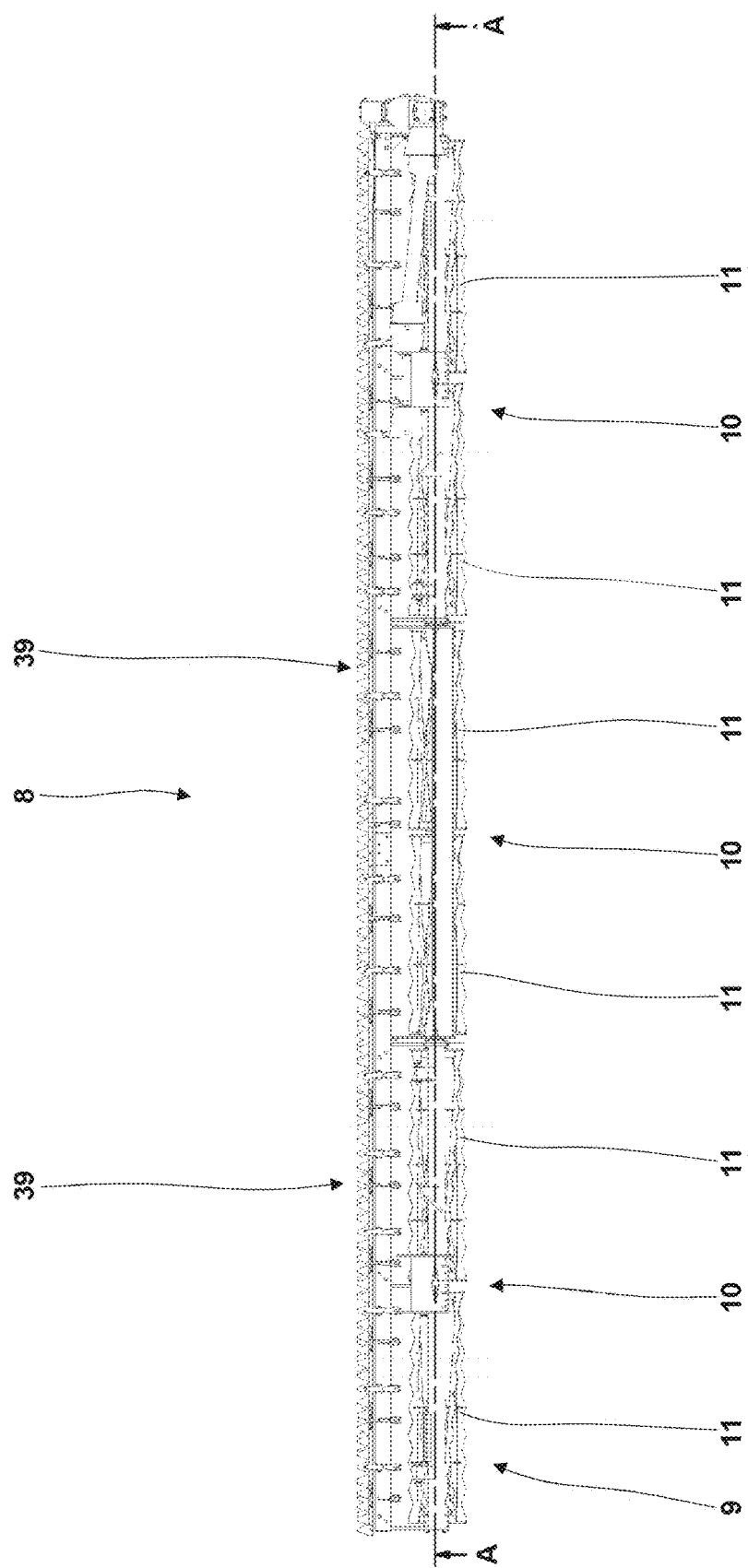
FIG. 27 shows a top view of the secondary implement with the central roller set in a non-lowered position.
Figure 28:
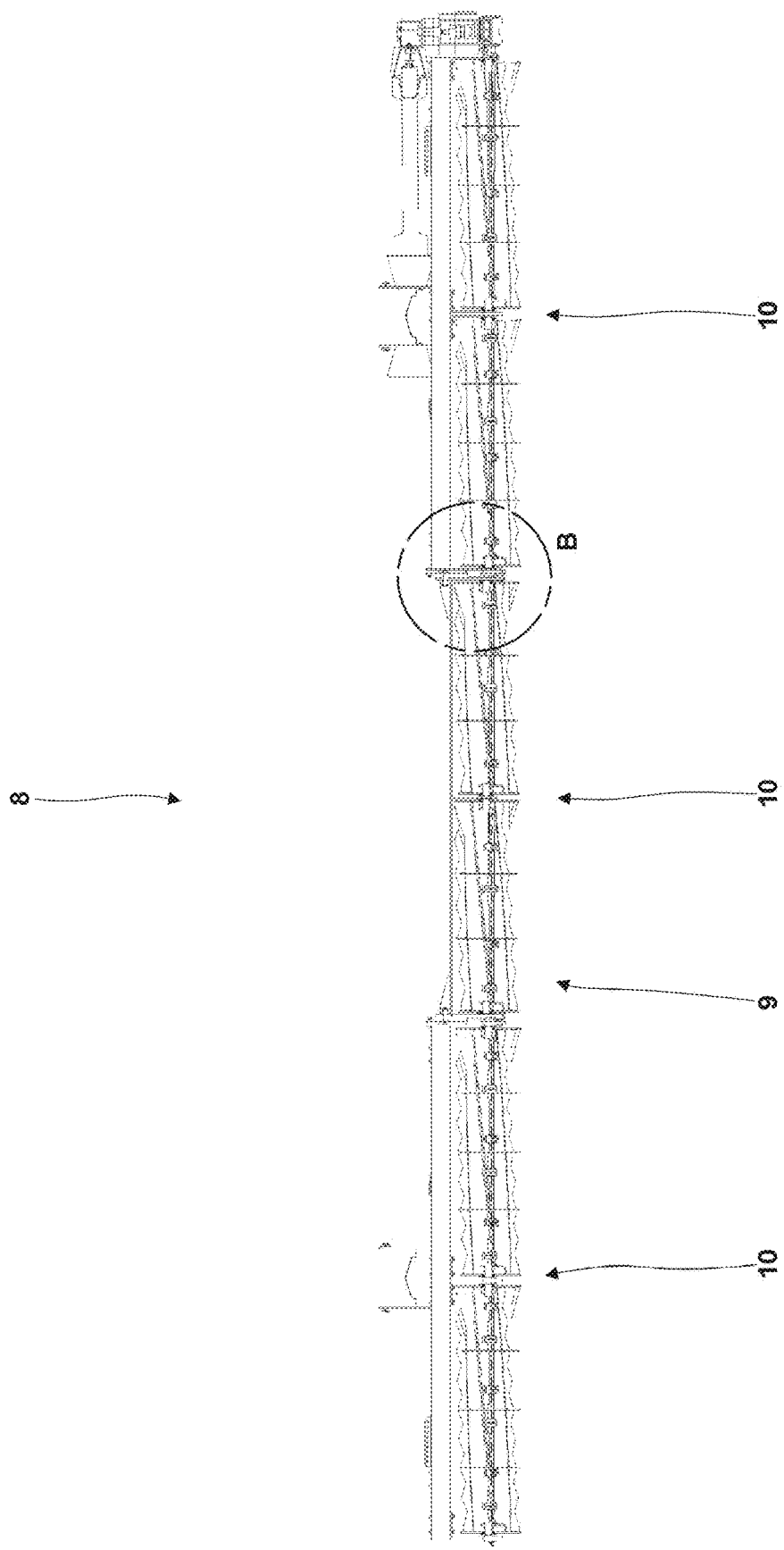
FIG. 28 shows a sectional view according to line A-A in FIG. 27.
Figure 29:
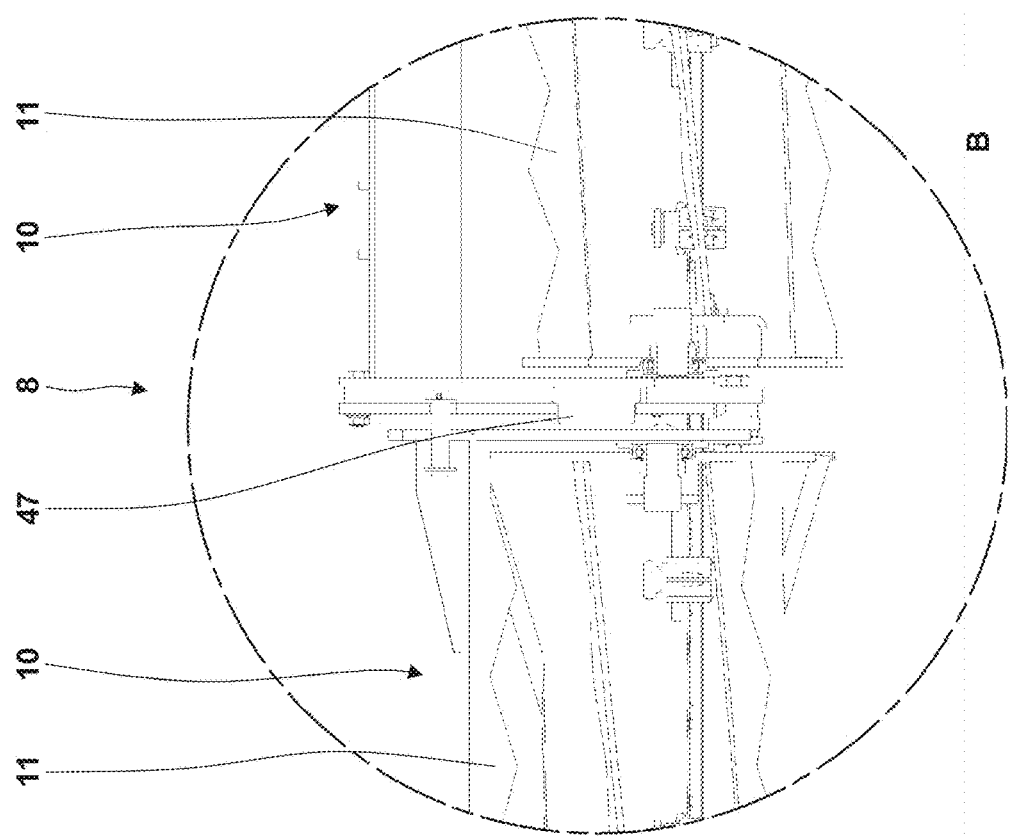
FIG. 29 shows the detail B of FIG. 28.

In FIGS. 27-29 and in FIG. 29 in particular, it can also be seen that the neighbouring roller sets 10 are connected together by means of a buffer element 47. Preferably, the buffer element 47 is made of rubber, plastic or another elastic material to allow some relative movement between the roller sets 10 without causing damage.

The invention claimed is:

1. A header for a combine harvester comprising:
a primary implement; and
a secondary implement comprising a roller unit, the roller unit comprising:
  a pair of frame elements, each comprising a guiding slot;
  an outer roller set comprising a rotatably supported roller; and
  a central roller set comprising:
    a rotatably supported roller;
    a pair of side plates;
    a guide element mounted on a first portion of each side plate, the guide element of each side plate engaging in the guiding slot of one of the pair of frame elements and thus defining a path of movement of the central roller set; and
    a bearing mounted on a second portion of each side plate, the bearing rotatably supporting the central roller set,
  wherein the central roller set is guided on the pair of frame elements to be lowerable relative to the outer roller set.

2. The header according to claim 1, wherein the central roller set is supported and guided on the pair of frame elements to automatically take a lowered position, when the rotatably supported roller of the central roller set is released from a ground surface during lifting of the header.

3. The header according to claim 2, wherein the central roller set is supported and guided on the pair of frame elements such that it is lowerable by gravity.

4. The header according to claim 1, wherein the guiding slot forms an arc of a circle.

5. The header according to claim 1, wherein:
the primary implement comprises a cutting unit,
the secondary implement comprises a second cutting unit, and
the central roller set is rotatably supported by a bearing, that is arranged under the second cutting unit, at a distance from the central roller set.

6. The header according to claim 1, wherein:
the side plates are generally L-shaped and each has a first limb and a second limb, and
  the guide element of each side plate is mounted on the first limb and the bearing of each side plate is mounted on the second limb.

7. The header according to claim 1, wherein the outer roller set is a first outer roller set, wherein the rotatably supported roller of the outer roller set is a first rotatably supported roller, and wherein the roller unit further comprises a second outer roller set comprising a second rotatably supported roller.

8. The header according to claim 1, wherein the outer roller set and the central roller set each further comprises a second rotatably supported roller.

9. The header according to claim 1, further comprising:
a link that is connected with the secondary implement; and
a lifting device with a slide element that is configured and connected with the link such that a translational movement of the slide element causes a lifting of the secondary implement relative to the primary implement.

10. The header according to claim 9, wherein the lifting device has a safety device that prevents an unwanted lifting of the secondary implement relative to the primary implement.

11. The header according to claim 1, wherein the primary implement is the main cutting unit of the combine harvester.

12. The header according to claim 11, wherein the secondary implement is a mowing unit, a chopping unit, or a swathing unit.

* * * * *